US012634891B2

(12) United States Patent
Fouad et al.

(10) Patent No.: US 12,634,891 B2
(45) Date of Patent: May 19, 2026

(54) SIDELINK MODE 2 RESOURCE SELECTION FOR INTRA-BAND COEXISTENCE BETWEEN NR V2X AND LTE V2X

(71) Applicant: Samsung Electronics Co., Ltd., Gyeonggi-do (KR)

(72) Inventors: Yaser Mohamed Mostafa Kamal Fouad, San Diego, CA (US); Philippe Jean Marc Michel Sartori, Naperville, IL (US)

(73) Assignee: Samsung Electronics Co., Ltd (KR)

( * ) Notice: Subject to any disclaimer, the term of this patent is extended or adjusted under 35 U.S.C. 154(b) by 456 days.

(21) Appl. No.: 18/101,167

(22) Filed: Jan. 25, 2023

(65) Prior Publication Data

US 2023/0300800 A1     Sep. 21, 2023

Related U.S. Application Data

(60) Provisional application No. 63/335,062, filed on Apr. 26, 2022, provisional application No. 63/321,970, filed on Mar. 21, 2022.

(51) Int. Cl.
*H04W 72/02*       (2009.01)
*H04W 72/0453*     (2023.01)
(Continued)

(52) U.S. Cl.
CPC ....... *H04W 72/02* (2013.01); *H04W 72/0453* (2013.01); *H04W 72/40* (2023.01); *H04W 88/06* (2013.01)

(58) Field of Classification Search
CPC .. H04W 72/02; H04W 72/40; H04W 72/0453
See application file for complete search history.

(56) References Cited

U.S. PATENT DOCUMENTS 11,304,180 B2     4/2022  Shin et al.
2018/0234889 A1   8/2018  Baghel et al.
(Continued)

FOREIGN PATENT DOCUMENTS

WO     WO 2021/203974     10/2021

OTHER PUBLICATIONS

LG Electronics, "New WID on NR Sidelink Enhancement", RP-193231, 3GPP TSG RAN Meeting #86, Dec. 9-12, 2019, 6 pages.
(Continued)

*Primary Examiner* — Won Tae C Kim
(74) *Attorney, Agent, or Firm* — The Farrell Law Firm, P.C.

(57)     ABSTRACT

A system and a method are disclosed resource selection by a UE in a coexistence band, the method includes obtaining, through a first communication scheme modem, a set of candidate resources for resource selection within a resource selection window, and first sensing information for potential resources for transmission, obtaining, through a second communication scheme modem, resource information corresponding to the second communication scheme, the resource information including second sensing information and future reservations; processing the resource information corresponding to the second communication scheme with the first sensing information; excluding resources, which are identified as occupied based on the processed information, from the set of candidate resources for resource selection for use by the first communication scheme; and selecting a resource for use by first communication scheme from remaining resources within the set of candidate resources after the excluding.

20 Claims, 13 Drawing Sheets

(51) Int. Cl.
   *H04W 72/40*      (2023.01)
   *H04W 88/06*      (2009.01)

(56) References Cited

U.S. PATENT DOCUMENTS

| | | |
|---|---|---|
| 2020/0146066 A1 | 5/2020 | Nguyen et al. |
| 2021/0144680 A1 | 5/2021 | Chervyakov et al. |
| 2021/0400650 A1 | 12/2021 | Shilov et al. |
| 2022/0015099 A1 | 1/2022 | Fouad et al. |
| 2022/0256548 A1 | 8/2022 | Park et al. |
| 2024/0032074 A1* | 1/2024 | Ye ......................... H04L 5/0064 |
| 2024/0397451 A1* | 11/2024 | Gao ...................... H04W 52/04 |
| 2025/0008532 A1* | 1/2025 | Dai ....................... H04W 72/25 |

OTHER PUBLICATIONS

ETSI TS 138 213 V16.4.0, 5G; NR; Physical Layer Procedures for Control (3GPP TS 38.213 Version 16.4.0 Release 16), Jan. 2021, 185 pages.

ETSI TR 137 985 V16.0.0, LTE; 5G; Overall Description of Radio Acess Network (RAN) Aspects for Vehicle-to-Everything (V2X) Based on LTE and. NR (3GPP TR 37.985 Version 16.0.0 Release 16), Jul. 2020, 37 pages.

InterDigital, Inc., "In-device Coexistence between LTE and NR V2X Sidelinks", R1-1912741, 3GPP TSG RAN WG1 #99, Nov. 18-22, 2019, 2 pages.

European Search Report dated Aug. 22, 2023 issued in counterpart application No. 23160700.3-1215, 10 pages.

\* cited by examiner

NR Transmission

LTE transmission

Time

LTE V2X band

FIG. 4

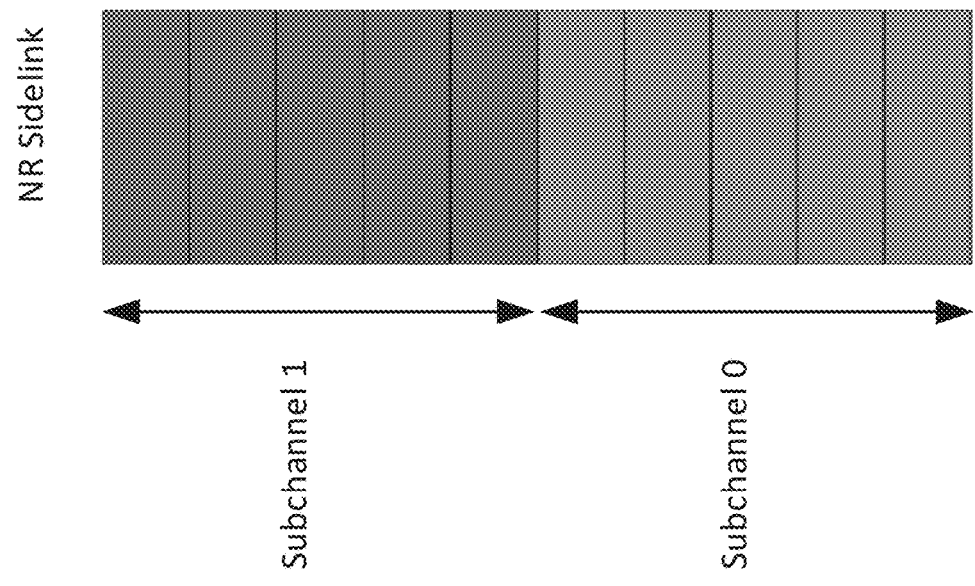
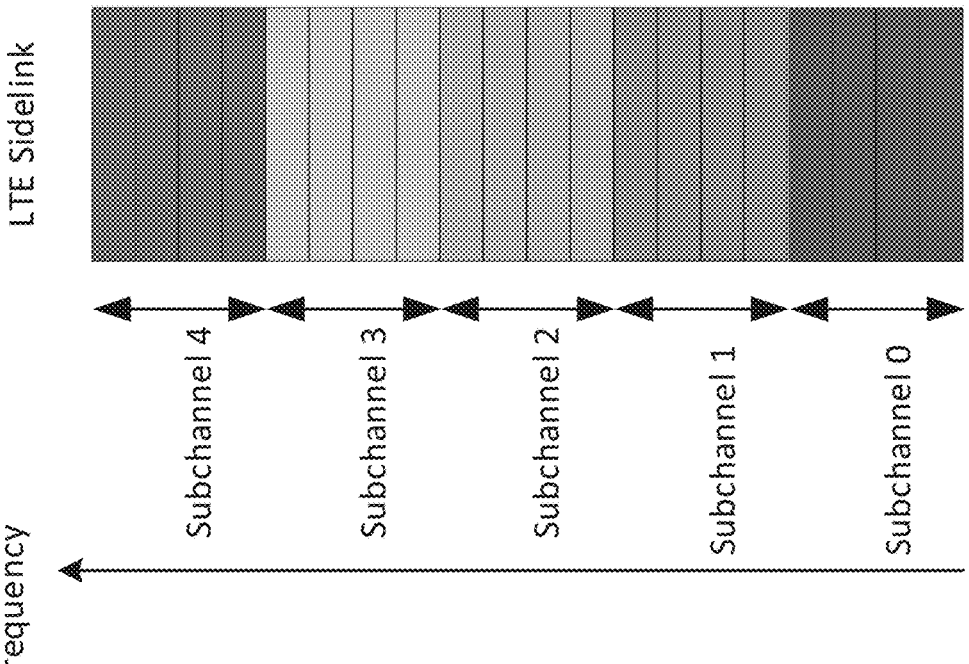
FIG. 5B

601 Obtain resource information corresponding to the NR scheme

603 Obtain resource information corresponding to the LTE scheme

605 Process LTE resource information with NR sensing information

607 Exclude overlapping resources

609 Select non-overlapping resource for use with the NR scheme from the candidate resource set

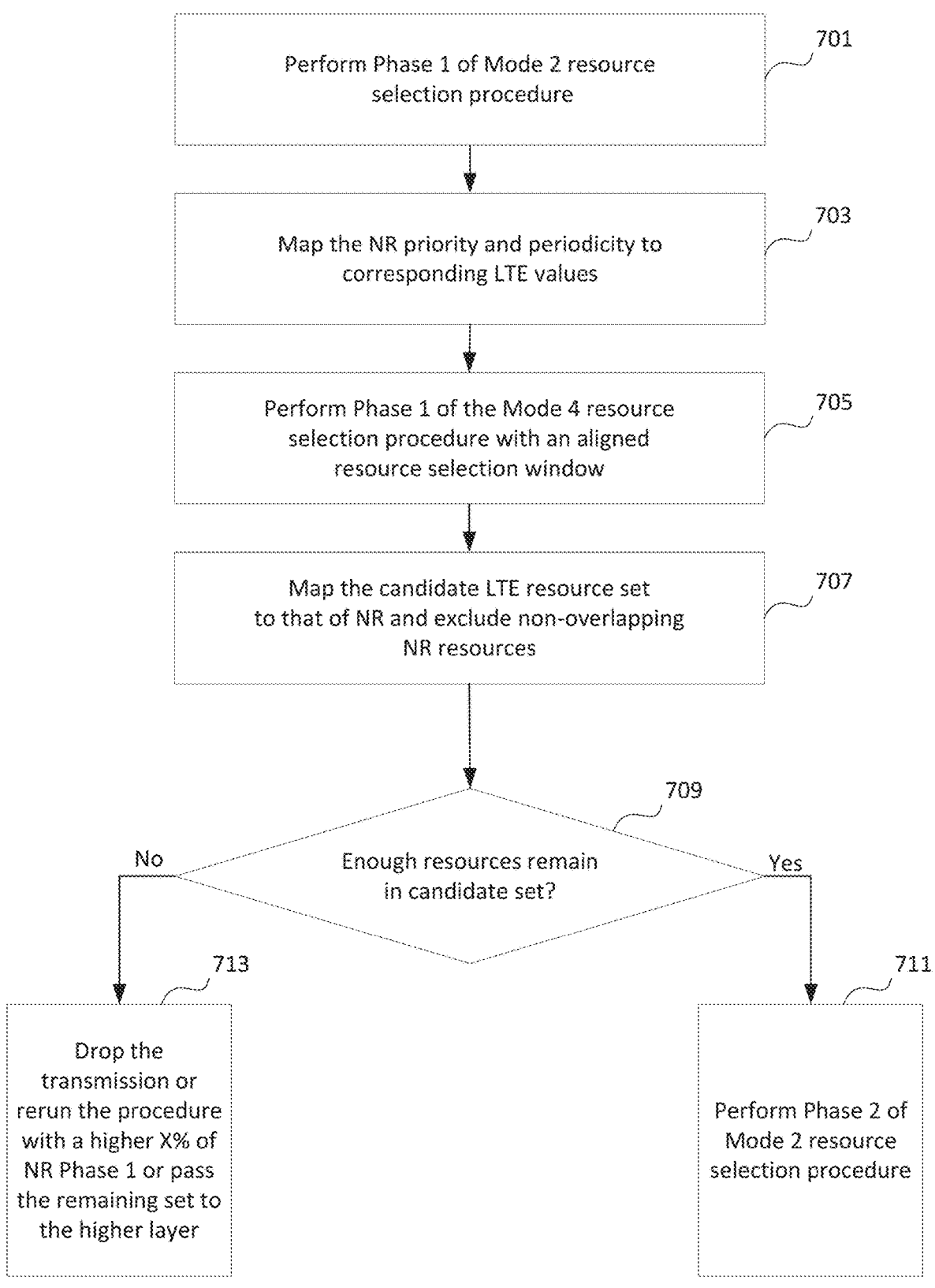

701
Perform Phase 1 of Mode 2 resource selection procedure

703
Map the NR priority and periodicity to corresponding LTE values

705
Perform Phase 1 of the Mode 4 resource selection procedure with an aligned resource selection window 707
Map the candidate LTE resource set to that of NR and exclude non-overlapping NR resources 709
Enough resources remain in candidate set?

No

Yes

713
Drop the transmission or rerun the procedure with a higher X% of NR Phase 1 or pass the remaining set to the higher layer 711
Perform Phase 2 of Mode 2 resource selection procedure

FIG. 7

SIDELINK MODE 2 RESOURCE SELECTION FOR INTRA-BAND COEXISTENCE BETWEEN NR V2X AND LTE V2X

CROSS-REFERENCE TO RELATED APPLICATIONS

This application claims the priority benefit under 35 U.S.C. § 119(e) to U.S. Provisional Application Nos. 63/321,970 and 63/335,062, filed on Mar. 21, 2022, and Apr. 26, 2022, respectively, the disclosure of each of which is incorporated by reference in its entirety as if fully set forth herein.

TECHNICAL FIELD

The disclosure generally relates to long term evolution (LTE) vehicle to everything (V2X) and new radio (NR) V2X coexistence. More particularly, the subject matter disclosed herein relates to improvements to power saving and resource selection for intra-band coexistence between NR V2X and LTE V2X.

SUMMARY

LTE V2X is expected to play a role in enabling the exchange of basic safety messages (BSMs) between neighboring vehicles. However, LTE V2X lacks the ability to support higher data traffic rates, thus limiting its applications.

In addition, LTE V2X spectrum may be underutilized due to the limited number of BSMs.

A possible approach to resolve these issues is to allow NR V2X to harvest the remaining unutilized LTE V2X spectrum and to coexist on the same carrier. This is unlike the in-device coexistence of Rel-16, in which a user equipment (UE) performs prioritization between LTE and NR sidelinks (SLs) on different carriers in a time division multiplexing (TDM) manner.

In case of co-channel coexistence between LTE and NR SLs on the same carrier, NR procedures must be carefully designed so as not to affect performance of LTE V2X. In particular, NR devices should be able to detect periodic LTE traffic and newly incoming LTE traffic, and accordingly, avoid their resource reservations.

In addition, NR procedures should be able to adapt Mode 2 resource selection mechanisms to avoid potential collisions when reservations are overridden by LTE devices and when the number of available resources for NR is limited and/or located far apart from one another.

To overcome these issues, systems and methods are described herein for improving the coexistence of LTE and NR devices without significantly impacting reliability of LTE transmissions by extending procedures defined for an NR carrier to a shared LTE-NR carrier.

Systems and methods are also described herein, wherein a new coexistence approach between LTE and NR V2X UEs is introduced in which only control signaling is transmitted in a coexistence band.

Systems and methods are also described herein for the operation of NR V2X UEs in a coexistence band with limited bandwidth.

Systems and methods are also described herein for an updated Mode 2 resource selection scheme that considers sensing information from co-located LTE and NR devices, when performing resource selection.

Systems and methods are also described herein for a simplified approach for considering an impact of sensing information from co-located LTE and NR devices, wherein phase 1 of the resource selection procedure is perform independently by each device and the results are then combined before starting phase 2 of the resource selection procedure.

Systems and methods are also described herein for providing different mapping rules between the LTE and NR V2X priorities.

Systems and methods are also described herein for providing a framework to allow priority-based triggering of resource reselection and pre-emption of NR resource selections/reservations based on sensing information and resource reservations obtained from a co-located LTE device.

The above approaches improve on previous methods because they allow for the transmission of NR V2X UE control signaling only in a coexistence band in order to minimize a performance impact on LTE V2X UEs.

The above approaches also improve on previous methods because they introduce new configurations for NR V2X UEs to operate in coexistence bands with limited bandwidth, reduce collisions between NR and LTE resource reservations in the coexistence band by introducing an updated Mode 2 resource selection scheme that includes the sensing information received from the co-located LTE modem when performing resource selection, and further reduce the chances of collisions between NR and LTE resource reservations by considering the impact of the half-duplex constraints of the two co-located modems.

The above approaches also improve on previous methods because they offer a low complexity update to the Mode 2 resource selection procedure that incorporates sensing information received from a co-located LTE modem, offer multiple mapping rules between priorities of NR and LTE V2X UEs when performing resource selection, and implement resource reselection and pre-emption in the coexistence framework.

In an embodiment, a method is provided for resource selection performed by a UE in a coexistence band of a first communication scheme and a second communication scheme. The method includes obtaining, through a first communication scheme modem, a set of candidate resources for resource selection within a resource selection window, and first sensing information for potential resources for transmission, obtaining, through a second communication scheme modem, resource information corresponding to the second communication scheme, the resource information including second sensing information and future reservations; processing the resource information corresponding to the second communication scheme with the first sensing information; excluding resources, which are identified as occupied based on the processed information, from the set of candidate resources for resource selection for use by the first communication scheme; selecting a resource for use by the first communication scheme from remaining resources within the set of candidate resources after the excluding; and transmitting using the selected resource.

In an embodiment, a UE to perform resource selection in a coexistence band of a first communication scheme and a second communication scheme is provided. The UE includes a first communication scheme modem; a second communication scheme modem; and a processor configured to obtain, through the first communication scheme modem, a set of candidate resources for resource selection within a resource selection window, and first sensing information for potential resources for transmission; obtain, through the second communication scheme modem, resource information corresponding to the second communication scheme, the resource information including second sensing information and future reservations; process the resource information corresponding to the second communication scheme with the first sensing information; exclude resources, which are identified as occupied based on the processed information, from the set of candidate resources for resource selection for use by the first communication scheme; select a resource for use by the first communication scheme from remaining resources within the set of candidate resources after the excluding; and transmit using the selected resource.

In an embodiment, a method is provided for resource selection performed by a UE in a coexistence band of a first communication scheme and a second communication scheme. The method includes obtaining, through a first resource selection procedure, a first set of candidate resources to be used for transmission in the first communication scheme; obtaining, through a second resource selection procedure, a second set of candidate resources in the second communication scheme; mapping, based at least on priority, the second set of candidate resources to counterparts resources in the first communication scheme; identifying, for each mapped candidate resource in the second set of candidate resources, overlapping candidates included in the first set of candidate resources; removing, from the first set of candidate resources, any candidate resources that are not identified as overlapping a mapped candidate resource in the second set of candidate resources; and transmitting using a resource selected from the first set of candidate resources.

BRIEF DESCRIPTION OF THE DRAWING

In the following section, the aspects of the subject matter disclosed herein will be described with reference to exemplary embodiments illustrated in the figures, in which:

FIG. 4 illustrates an example of dynamic coexistence between LTE and NR transmissions, according to an embodiment;

FIG. 5B illustrates overlap in a frequency domain based on subchannel sizes and SCS of LTE and NR according to an embodiment;

FIG. 7 is flowchart illustrating a simplified version of the Mode 2 procedure for resource selection in a coexistence band, according to an embodiment;

DETAILED DESCRIPTION

Figure 1:
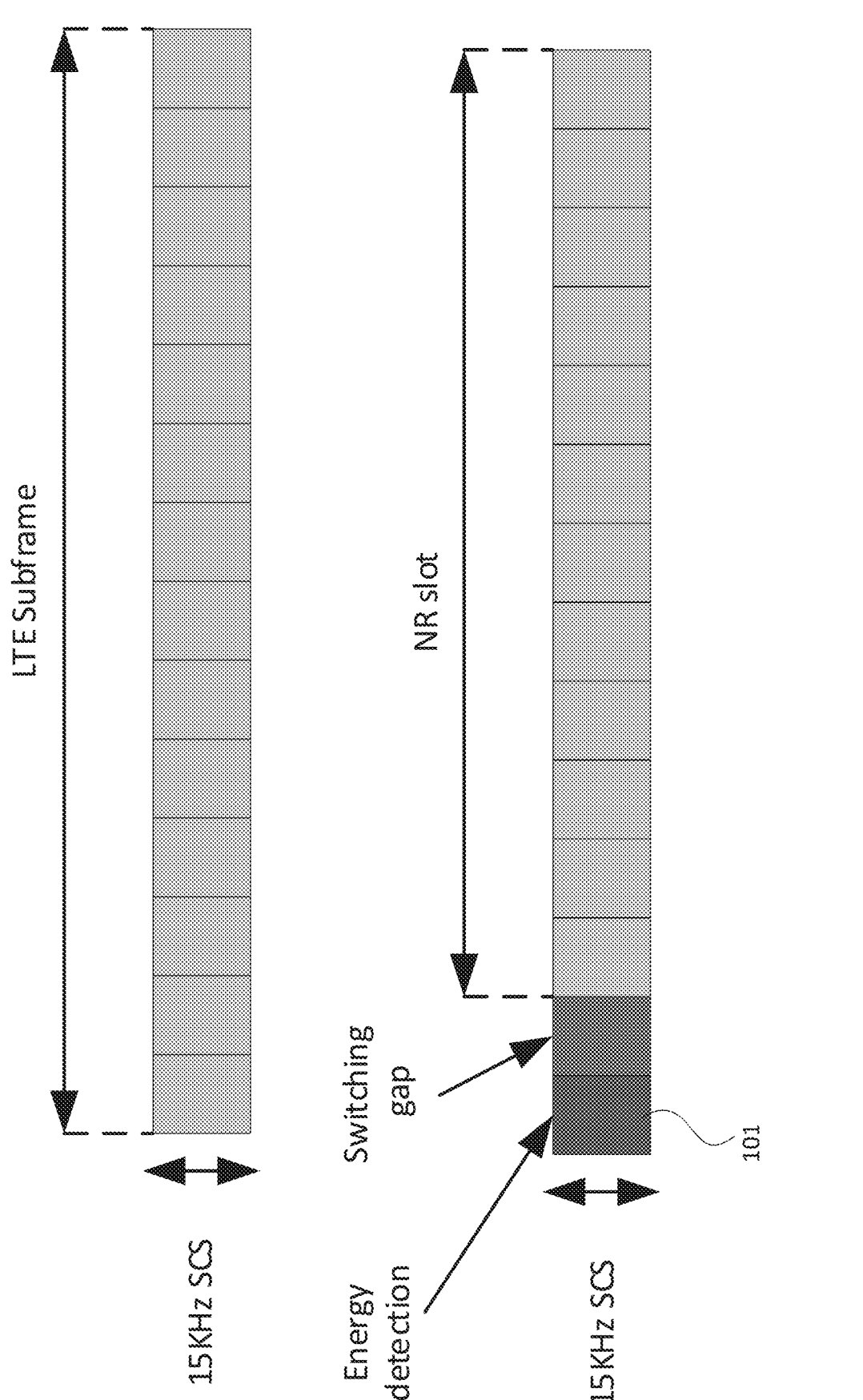
FIG. 1 illustrates an example of energy detection before transmission in a coexistence band by NR UEs.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Although various embodiment of the disclosure are described below with reference to LTE and NR as different communication schemes of a coexistence band, the present disclosure is not limited to these specific communications schemes and may be applied to other communication schemes having similar features and configurations.

LTE V2X was standardized in order to allow communication between nearby vehicles. LTE V2X communication links allow vehicles to exchange BSMs to avoid potential accidents or to enhance the user experience by sharing real-time road characteristics (e.g., traffic).

However, as LTE V2X was mostly designed for periodic traffic, it offers limited data rates, and is designed only for broadcasting messages. To address these limitations, NR Rel-16 V2X was developed to offer support for aperiodic traffic and data rate enhancements to offer support for a wider variety of applications. Subsequently, NR Rel-16 and Rel-17 are expected to operate concurrently with LTE V2X on a separate band to widen the range of supported V2X applications.

Operating NR and LTE independently is possible, but suboptimal. In particular, given the nature of BSMs, the LTE V2X spectrum is not expected to be fully occupied at any given instance.

Coexistence of NR SL and LTE SL on the same carrier is currently being investigated by the $3^{rd}$ generation partnership project (3GPP).

Given the nature and importance of BSMs carried by LTE, it is important that the performance of LTE is not significantly affected by NR. In addition, LTE V2X should be able to operate without being aware of the NR V2X operation on the same carrier to maintain backward compatibility.

In accordance with aspect of the disclosure, techniques/procedures are provided for the coexistence of LTE and NR devices, without significantly impacting the reliability of LTE transmissions, by extending procedures defined for an NR carrier to a shared LTE-NR carrier.

Rel-16 NR/LTE In-Device Coexistence

In Rel-16, LTE and NR in-device coexistence is supported when LTE and NR are deployed on different carriers. In particular, a UE is assumed to have LTE and NR capabilities, wherein there is subframe boundary alignment between LTE and NR V2X SLs, and both LTE and NR V2X SLs are aware of a time resource index (e.g., a direct frame number (DFN) for LTE) in both carriers.

In addition, there may be short term TDM coexistence between the LTE and NR SLs on different carriers. In particular, the following was considered in case of transmission (Tx)/Tx, reception (Rx)/Rx, and Tx/Rx overlap between the two SLs:

For Tx/Tx overlap, if packet priorities of the LTE and NR SL transmissions are known to both radio access technologies (RATs) prior to time of transmission subject to processing time restrictions, then the packet with a higher relative priority is transmitted. In case the priorities of LTE and NR SL transmissions are the same, it is up to UE implementation as to which transmission is chosen (e.g., taking into account congestion and/or other factors). If packet priorities of both LTE and NR SL transmissions are not known to both RATs prior to time of transmission subject to processing time restriction, it is up to UE implementation to manage Tx/Tx overlaps (e.g., LTE transmissions are always prioritized, etc.).

For Rx/Rx overlap, it is up to UE implementation to manage reception of LTE and NR SLs.

For Tx/Rx overlap, if packet priorities of the LTE and NR SLs are known to both RATs prior to time of transmission/reception subject to processing time restrictions, then a packet with a higher relative priority is transmitted/received. In case the priorities of LTE and NR SL packets are the same, then it is up to UE implementation as to which packet is transmitted/received.

However, these techniques do not offer any flexibility in using unutilized LTE resources by an NR SL. Instead, they apply only for NR and LTE deployed on different carriers, whereas the scope in Rel-18 is now expanded to NR and LTE sharing the same carrier. In addition, the UE is limited to performing prioritization between the LTE and NR SL transmissions on different carriers (i.e., short-term TDM between the LTE and NR SLs based on priority). In addition, this prioritization is also restricted to processing time restrictions, which can be as high as 4 ms, as agreed in RAN1 #102.

Intra-Band Coexistence Between NR V2X and LTE V2X

To avoid the impact of NR UEs on LTE UEs in coexistence band, one possibility is to rely on energy detection. For example, an energy-detection based avoidance mechanism may be used by NR devices to detect LTE reservations and accordingly avoid them. In particular, an NR device can perform energy detection on one or more symbols at the beginning of each subframe and accordingly decide whether to access this resource or not.

FIG. 1 illustrates an example of energy detection before transmission in a coexistence band by NR UEs.

Referring to FIG. 1, an NR device performs sensing in a first symbol 101, then switches and performs NR transmission for the remainder of the subframe (i.e., the remaining 12 OFDM symbols in case of 15 KHz subcarrier spacing (SCS)).

The sensing, as illustrated in FIG. 1, can be used to enable further protection to LTE devices when considered in addition to the detected periodic reservations by LTE. This may help in reducing the chances of collisions with LTE aperiodic-like traffic (i.e., the beginning of the periodic reservations by LTE) and periodic traffic in case of the absence of an LTE modem in the NR UE. Alternatively, it can also be used to achieve better utilization by reusing the resources blocked by the LTE periodic reservations if no energy is detected.

Resource Selection Assistance Schemes 1 and 2 of NR Rel-17 SL

In NR Rel-17, two resource selection assistance schemes have been developed for SL transmissions. An objective of these schemes is to resolve conflicts due to a half-duplex constraint, a hidden node problem, and consistent collisions.

In the first scheme (i.e., scheme 1), an assisting UE (referred to as UE-A) provides a set of preferred or non-preferred resources to an assisted UE (referred to as UE-B). This can be done based on UE-A receiving an explicit request for resource selection assistance from the UE-B or based on a pre-configured triggering condition. To obtain the set of preferred or non-preferred resources, the UE-A executes the Mode 2 resource selection scheme to identify resources reserved by neighboring UEs. This may increase the effective sensing range of UE-B, helping to resolve the hidden node problem. In addition, the UE-A also considers the set of reserved resources for its future transmissions when performing the resource selection, which may reduce the impact of the half-duplex constraint on the performance.

Once the resource selection assistance set is acquired at the UE-A, it may transmit this set to the UE-B within a given time constraint. When the UE-B receives the set of resources, two cases can be considered:

1) When the UE-B performs sensing for resource selection, it considers both the received resource selection assistance set and its own sensing results when performing resource selection. In particular, when a non-preferred resource set is received, these resources may be excluded from the resources obtained after performing sensing and before the final selection by the MAC layer. However, when a preferred resource set is received, the UE-B obtains an intersection set between the sensed resources and the received preferred resource set and then passes this intersection set to the MAC layer for resource selection.

2) When the UE-B does not perform sensing, then it uses only the received preferred resource set and passes this set to the MAC layer for resource selection.

When sending the resource selection assistance set, the UE-A should occupy at least one subchannel over one slot. In addition, the UE-A should perform sensing to find the resources to transmit its assistance report. In case the assistance is performed based on a request from the UE-B, the UE-A should also reserve resources and perform a transmission that carries the resource selection assistance request. Consequently, Scheme 1 may result in high latency and resource consumption; especially when the UE-B is transmitting a short packet with tight latency constraints.

In the second scheme (i.e., scheme 2), UE-A uses physical SL feedback channel (PSFCH) resources to provide a conflict indication to the UE-B. In particular, when the UE-B sends SL control information (SCI) that includes a reservation of a future resource and the UE-A detects that this resource reservation conflicts with another reservation from a neighboring UE, then it uses the PSFCH to send a conflict indication to the UE-B. Subsequently, the UE-B performs resource reselection to obtain a non-conflicting resources for its future transmission.

Resource Selection Procedures for LTE V2X UEs

Mode 3

Mode 3 is for resource allocation scheduled by an eNB. The eNB scheduling activity is driven by a UE needing to send data on a SL, and performing an SL buffer status reporting (BSR) procedure similar to that on a Uu in order to request an SL resource allocation from the eNB. Depending on a type of traffic the UE has to send, the eNB can provide a dynamic SL grant or an activation of a semi-persistent scheduling (SPS) SL grant.

Dynamic DL grant downlink control information (DCI) provides resources for up to two transmissions of the same transport block (TB), which allows higher reliability to be achieved without a feedback-based hybrid automatic repeat request (HARQ) procedure, since an LTE-V2X physical layer supports only broadcast transmission. Unlike Uu UL grants, modulation and coding scheme (MCS) information can optionally be provided by radio resource control (RRC) signaling instead of traditional DCI. When the RRC does not provide the MCS, a transmitting UE should select an appropriate MCS/transport block size (TBS) itself, based on the knowledge it has of the TB to be transmitted and, potentially, the SL radio conditions. The transmitting UE may populate its SCI with the information from eNB and other fields related to the SL operation, and then transmit the SCI and an associated physical SL shared channel (PSSCH).

The eNB can configured the UE with up to 8 SL SPS configurations, where each SL SPS configuration has an identifying index and provides a different periodicity of SL transmission resource. An SL SPS configuration is not used by the UE until the eNB sends the UE a DCI that indicates that the SL SPS configuration is now active. The activating DCI also provides the same fields as a dynamic SL scheduling DCI described above, allowing for precise resource allocation of SPS to be determined by the eNB. A transmitting UE can use the activated SL SPS resources, at the configured periodicity, until they are released (i.e., deactivated) by the eNB transmitting a special DCI. Each time the UE uses the resources, it either uses the RRC configured MCS/TBS or selects one itself, i.e., the same as a dynamic operation.

Mode 4

Mode 4 is for UE autonomous resource selection. Essentially, a UE senses, within a configured resource pool, which resources are not in use by other UEs with higher-priority traffic, and chooses an appropriate amount of such resources for its own PSCCH/PSSCH transmission. Having selected the resources, the UE can transmit in them on a periodic (i.e., SPS) basis for a certain number of times, or until a cause of resource reselection is triggered.

The SCIs transmitted by UEs on PSCCHs indicate time-frequency resources in which the UEs will transmit a PSSCH. The same SCI content as used in Mode 3 is used in Mode 4, and also indicates the periodicity with which the UE will use the same resources. These SCI transmissions are used by sensing UEs to maintain a moving sensing window in the immediate past of which resources have been reserved by other UEs. For example, the moving sensing window is 1000 ms long for frequency division duplexing (FDD) systems. A sensing UE also measures the PSSCH-reference signal received power (RSRP) in the subframes of the sensing window, which implies the level of interference that would be caused and experienced if the sensing UE were to transmit in them.

The sensing UE then selects resources for its first transmission from within a resource selection window. This window may begin ≤4 ms after the trigger for transmission, and is bounded by the latency requirement of the traffic, up to 100 ms. The sensing UE assumes the same resources will be used by other UEs in the future as have been found reserved during the sensing window, according to the indicated periodicities and durations. Reserved resources in the selection window with a PSSCH-RSRP above a threshold are excluded from being candidates by the sensing UE, with the threshold being set according to the priorities of the traffic of the sensing and transmitting UE. Thus, a higher priority transmission from a sensing UE can occupy resources that are reserved by a transmitting UE with a relatively lower PSSCH-RSRP and relatively lower-priority traffic.

From the set of resources in the selection window that have not been excluded, the sensing UE identifies those containing the lowest total received energy as a way to account for transmissions that were not found during decoding of the PSCCHs, and identifies resources totaling 20% of the available resources within the traffic's latency bound, including gradual relaxation of the PSSCH-RSRP exclusion thresholds in 3 dB steps, if necessary. The UE then selects a resource at random from the identified 20% and uses this resource semi-persistently for its transmissions.

There are a number of triggers for resource re-selection. The triggers may be designed to support high mobility, and ensure that a UE cannot assume occupation of a resource for an excessive period, nor when the selected resource is either insufficient or excessive for what is needed by the UE's traffic, amongst other causes.

Figure 2:
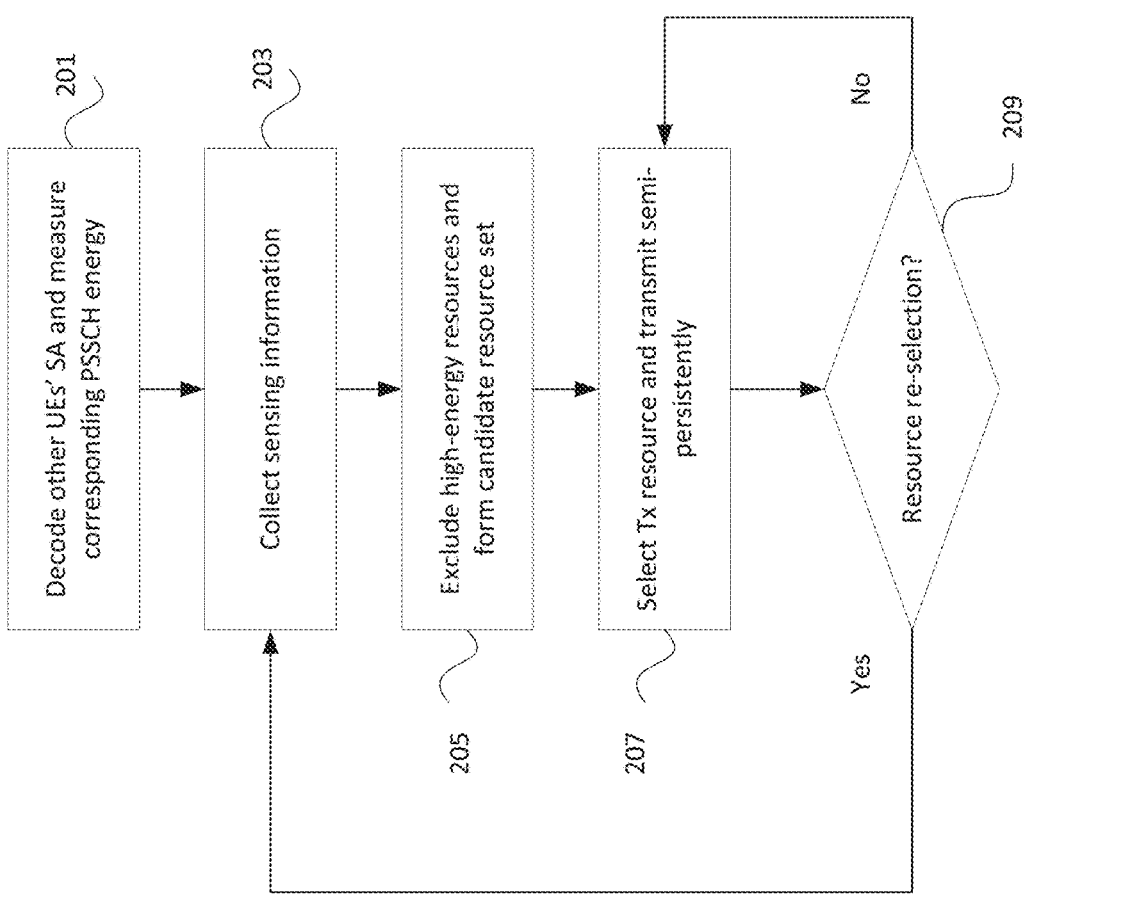
FIG. 2 is a flowchart illustrating Mode 4 sensing and resource selection procedures.

FIG. 2 is a flowchart illustrating Mode 4 sensing and resource selection procedures.

Referring to FIG. 2, in step 201, the sensing UE decodes other UEs' scheduling assignments (SAs) and measures the corresponding PSSCH energy.

In step 203, the sensing UE collects sensing information including PSSCH-RSRP and SL received signal strength indicator (S-RSSI) measurements.

In step 205, the sensing UE excludes high-energy resources and forms a candidate resource set. As described above, reserved resources in the selection window with a PSSCH-RSRP above a threshold are excluded from being candidates by the sensing UE, such that a higher priority transmission from the sensing UE can occupy resources that are reserved by a transmitting UE with a relatively lower PSSCH-RSRP and relatively lower-priority traffic.

In step 207, the sensing UE selects a resource for transmission from the candidate resource set and uses this resource semi-persistently for its transmissions.

In step 209, the sensing UE determines if resource-reselection should be performed. As described above, there may be a number of triggers for determining resource re-selection.

When the sensing UE determines to perform resource selection in step 209, the process returns to step 203, at which the sensing UE collects sensing information again. However, when the sensing UE determines not to perform resource selection in step 209, i.e., resource-reselection is not triggered, the process returns to step 207, at which the sensing UE re-selects a resource for transmission from the candidate resource set and uses this resource semi-persistently for its transmissions.

Resource Selection Procedures for NR UEs

Mode 1

Mode 1 is for resource allocation by a gNB. The use cases intended for NR V2X can generate a diverse array of periodic and aperiodic message types. Therefore, resource allocation mode 1 provides dynamic grants of SL resources from a gNB, as well as grants of periodic SL resources configured semi-statically by RRC (referred to as "SL configured grants (CGs)").

Dynamic SL grant DCI can provide resources for one or multiple transmissions of a TB, in order to control reliability. The transmission or transmissions can be subject to an SL HARQ procedure, if that operation is enabled.

A Type 1 CG is an SL CG that is configured once and is immediately used by a UE, until it is released by RRC signaling. The UE is allowed to continue using this type of SL CG when beam failure or physical layer problems occur in NR Uu, until a radio link failure (RLF) detection timer expires, before falling back to an exception resource pool.

A Type 2 CG is an SL CG that is configured once, but cannot be used until the gNB sends, to the UE, DCI indicating that it is now active. The Type 2 CG may be used until another DCI is received, which indicates deactivation.

The resources in both Type 1 and Type 2 CGs include a set of SL resources recurring with a periodicity that a gNB desires to match to characteristics of V2X traffic. Multiple CGs can be configured in order to allow for different services, traffic types, etc.

MCS information for dynamic grants and CGs can optionally be provided or constrained by RRC signaling, instead of DCI. RRC signaling can be used to configure an MCS used by a transmitting UE, or a range of MCSs. The MCS may also be left as not configured.

When the RRC signaling does not provide the exact MCS, the transmitting UE should select an appropriate MCS itself, based on the knowledge it has of the TB to be transmitted and, potentially, the SL radio conditions.

The gNB scheduling activity is driven by the UE reporting its SL traffic characteristics to the gNB, or by performing an SL BSR procedure similar to that on Uu in order to request an SL resource allocation from the gNB.

Mode 2

Mode 2 is for UE autonomous resource selection. In Mode 2, a UE senses, within a configured resource pool, which resources are not in use by other UEs with higher-priority traffic, and chooses an appropriate amount of such resources for its own transmissions. Having selected such resources, the UE can transmit and re-transmit using the selected resources a certain number of times, or until a resource reselection is triggered.

In the Mode 2 sensing procedure, a sensing UE can select and then reserve resources for a variety of purposes reflecting that NR V2X introduces SL HARQ in support of unicast and groupcast in the physical layer. The sensing UE may reserve resources to be used for a number of blind (re-)transmissions or HARQ-feedback-based (re-)transmissions of a TB, in which case the resources are indicated in SCI scheduling the TB. Alternatively, the sensing UE may select resources to be used for an initial transmission of a later TB, in which case the resources are indicated in SCI scheduling a current TB, in a manner similar to the LTE-V2X scheme. An initial transmission of a TB can be performed after sensing and resource selection, but without a reservation.

First-stage SCI transmitted by UEs on PSCCHs indicate time-frequency resources in which the UEs will transmit a PSSCH. These SCI transmissions are used by sensing UEs to maintain a record of which resources have been reserved by other UEs. When a resource selection is triggered (e.g., by traffic arrival or a re-selection trigger), the sensing UE considers a sensing window that starts a (pre-)configured time in the past and finishes shortly before the trigger time. For example, the window can be either 1100 ms or 100 ms wide, with the intention that the 100 ms option is particularly useful for aperiodic traffic, and 1100 ms particularly for periodic traffic. The sensing UE also measures an SL-RSRP in the slots of the sensing window, which implies the level of interference that would be caused and experienced if the sensing UE were to transmit in them. In NR-V2X, an SL-RSRP is a (pre-)configurable measurement of a PSSCH-RSRP or a PSCCH-RSRP.

The sensing UE then selects resources for its (re-)transmission(s) from within a resource selection window. The window starts shortly after the trigger for (re-)selection of resources, and cannot be longer than the remaining latency budget of the packet due to be transmitted. Reserved resources in the selection window with an SL-RSRP above a threshold are excluded from being candidates by the sensing UE, with the threshold being set according to priorities of traffic of the sensing and transmitting UEs. Thus, a higher priority transmission from a sensing UE can occupy resources which are reserved by a transmitting UE with a relatively lower SL-RSRP and relatively lower-priority traffic.

If the set of resources in the selection window that have not been excluded is less than a certain proportion of the available resources within the window, the SL-RSRP exclusion threshold may be relaxed in 3 dB steps. The proportion is set by (pre-)configuration to 20%, 35%, or 50% for each traffic priority.

The UE randomly selects an appropriate amount of resources from this non-excluded set. The resources selected are generally not periodic. For example, up to three resources can be indicated in each SCI transmission, and each resource may be independently located in time and frequency.

When the indicated resources are for semi-persistent transmission of another TB, the range of supported periodicities is expanded compared to LTE-V2X, in order to cover the broader set of envisioned use cases in NR-V2X.

Before transmitting in a reserved resource, a sensing UE re-evaluates the set of resources from which it can select, in order to check whether its intended transmission is still suitable, taking account of late-arriving SCI, which are typically caused by an aperiodic higher-priority service starting to transmit after the end of the original sensing window. If the reserved resources would not be part of the set for selection at this time (i.e., T3), then new resources are selected from the updated resource selection window. The cut-off time T3 should be long enough before transmission to allow the UE to perform the calculations relating to resource re-selection.

There may be a number of triggers for resource re-selection, several of which are similar to LTE-V2X. In addition, there is the possibility to configure a resource pool with a pre-emption function designed to help accommodate aperiodic SL traffic, so that a UE reselects all the resources it has already reserved in a particular slot if another nearby UE with higher priority indicates it will transmit in any of them, implying a high-priority aperiodic traffic arrival at the other UE, and the SL-RSRP is above the exclusion threshold. The application of pre-emption can apply between all priorities of data traffic, or only when the priority of the pre-empting traffic is higher than a threshold and higher than that of the pre-empted traffic. A UE does not need to consider the possibility of pre-emption later than time T3 before the particular slot containing the reserved resources.

Figure 3:
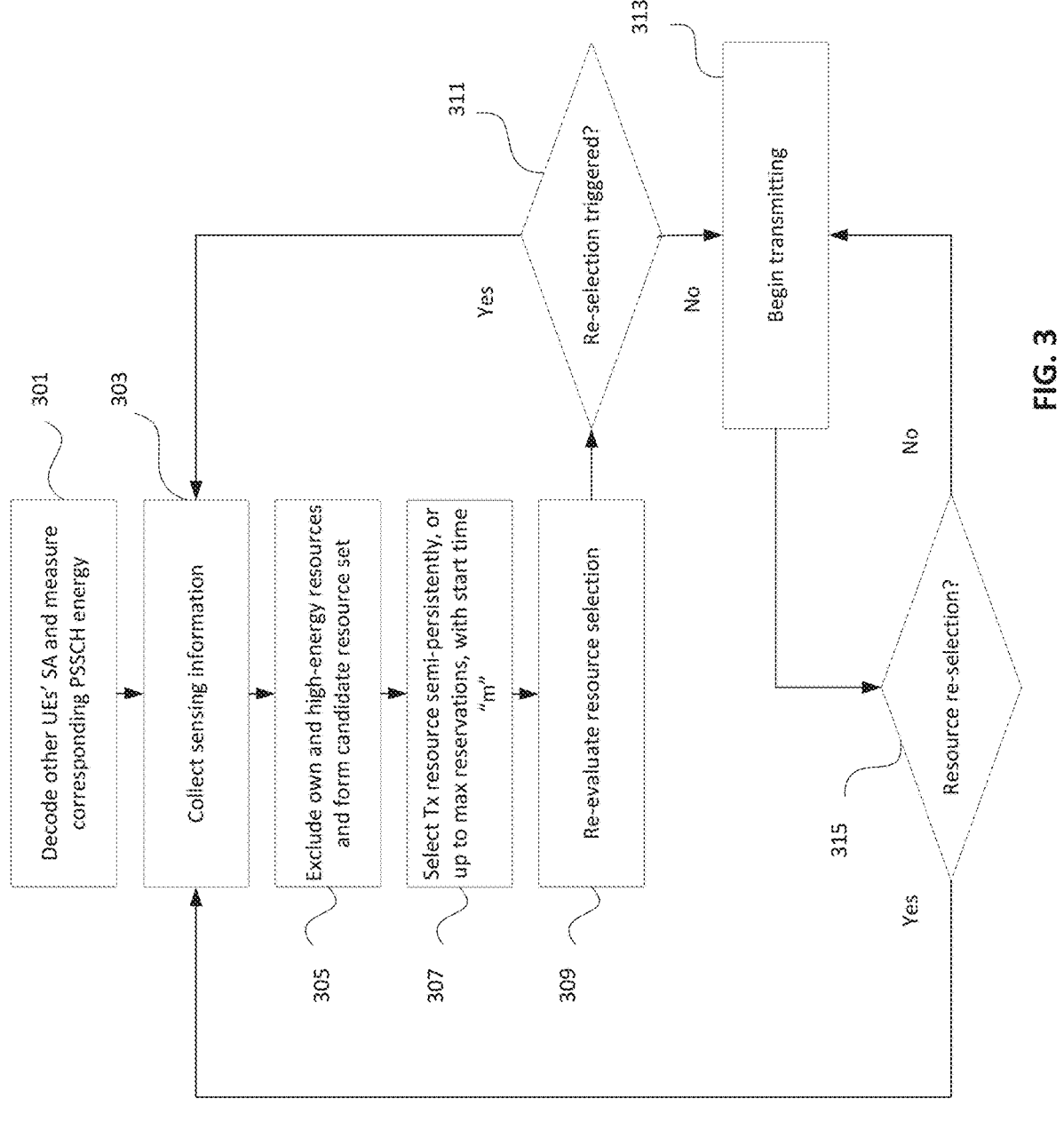
FIG. 3 is a flowchart illustrating Mode 2 sensing and resource selection procedures.

FIG. 3 is a flowchart illustrating Mode 2 sensing and resource selection procedures.

Referring to FIG. 3, in step 301, the sensing UE decodes other UEs' scheduling SAs and measures the corresponding PSSCH energy.

In step 303, the sensing UE collects sensing information including PSSCH-RSRP and S-RSSI measurements.

In step 305, the sensing UE excludes high-energy resources and forms a candidate resource set.

In step 307, the sensing UE selects a resource for transmission from the candidate resource set.

In step 309, the sensing UE re-evaluates the selected resource.

In step 311, the sensing UE determines whether re-selection is triggered, based on the re-evaluation. As described above, a sensing UE may re-evaluates the set of resources from which it can select, in order to check whether its intended transmission is still suitable, taking account of late-arriving SCI. If the reserved resources would not be part of the set for selection at this time (i.e., T3), then new resources are selected from the updated resource selection window.

When the sensing UE determines that re-selection is triggered in step 311, the process returns to step 303, at which the sensing UE collects sensing information again. However, when the sensing UE determines that re-selection is not triggered in step 311, the sensing UE starts transmitting using the selected resource.

In step 315, the sensing UE determines if resource-reselection should be performed. As described above, there may be a number of triggers for determining resource re-selection.

When the sensing UE determines to perform resource selection in step 315, the process returns to step 303, at which the sensing UE collects sensing information again. However, when the sensing UE determines not to perform resource selection in step 315, i.e., resource-reselection is not triggered, the process returns to step 312, at which the sensing UE continues transmitting using the selected resource in step 313.

As described above, semi-static coexistence can be configured between LTE and NR UEs to share resources. However, semi-static coexistence may jeopardize safety applications, is still somewhat inefficient, and cannot be location dependent.

More specifically, allocating a limited number of resources to LTE V2X UEs will result in increased collisions, thereby limiting the reliability of BSM transmissions.

Further, as semi-static partitioning does not adapt to traffic, it may result in either too many or too few resources being allocated for one system. Further, it is also difficult to re-configure LTE devices already deployed in the system.

Semi-static coexistence configuration cannot be location dependent because it should be pre-configured in order to enable out-of-coverage operation.

In view of the foregoing, there is a desire for dynamic coexistence between LTE V2X and NR SL. For example, the 5G automotive association (5GAA) has been pushing for this feature for a while.

Figure 4:
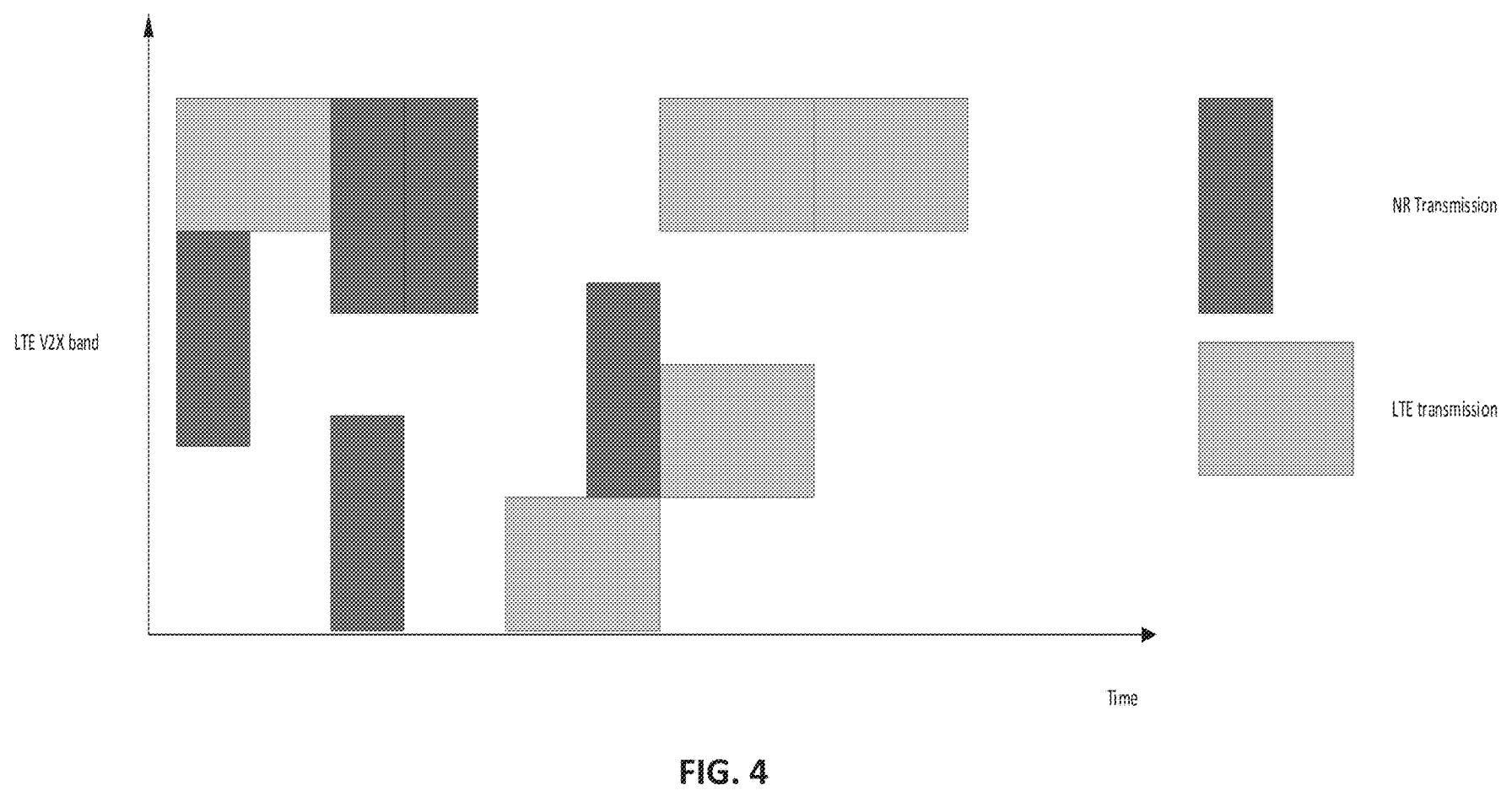

FIG. 4 illustrates an example of dynamic coexistence between LTE and NR transmissions, according to an embodiment.

Dynamic coexistence also allows for the efficient utilization of LTE V2X spectrum. To achieve this goal, NR V2X should harvest remaining, unutilized LTE V2X spectrum and coexist on the same carrier.

Herein, various procedures are provided to maximize gain from NR and LTE in-band coexistence, while minimizing the performance impact on LTE V2X UEs. In particular, the following are provided:

Updated Mode 2 procedure for resource selection in a coexistence band, which minimizes interference incurred by LTE UEs due to collisions.

Simplified version of the Mode 2 procedure for resource selection in a coexistence band, which simplifies a processing burden on NR UEs while minimizing their impact on their LTE counterparts in the coexistence band.

Resource reselection and pre-emption procedure, which reduces latency and improves transmission reliability of LTE transmissions by reducing the chances of collisions between NR and LTE systems.

Limited transmissions in coexistence band procedure, which reduce the chances of collisions with LTE UEs by sending only control information in a coexistence band.

A procedure for handling cases when a subchannel size is larger than an LTE bandwidth, which allows for more flexibility for an SL NR operation in a coexistence band.

Updated Mode 2 Procedure for Resource Selection in a Coexistence Band

When NR UEs coexist with LTE UEs in the same band, NR UEs should attempt to avoid collisions with neighboring NR and LTE UE reservations. For example, any resources overlapping with a reservation by an LTE UE should be avoided based on the respective priorities of the NR and LTE transmissions in order to reduce the impact on NR UEs. In view of the foregoing, in accordance with an embodiment of the disclosure, the Mode 2 resource selection procedure may be updated to consider reservations done by NR and LTE UEs. In particular, the following updates are provided:

LTE Future Reservations:

If an NR UE has a collocated LTE modem, it may detect future reservations (periodic and aperiodic) by neighboring LTE UEs. These future reservations should be considered in Step 6 of the Mode 2 resource selection procedure in 3GPP 38.214, subject to processing time restrictions. More specifically, a new duration can be defined (e.g., $T_4$) whereby any LTE reservation detected before slot $n\text{-}T_4$ will be considered for resource selection at slot n to allow for processing at the LTE modem and the exchange of information between the two modems.

Effect of the Half-Duplex Constraint:

In Step 5 of the Mode 2 resource selection procedure in 3GPP 38.214, an NR UE that transmitted at slot n within the sensing window assumes the presence of a hypothetical SCI and accordingly excludes a set of resources within the resource selection window to avoid collisions with neighboring UEs that were not detected due to the half-duplex constraint. Similarly, when operating in the coexistence band, the NR UE should consider the impact of the half-duplex constraint on both (NR and LTE UEs). More specifically, when performing the resource exclusions from the resource selection window, the configured periods of the NR and LTE are considered based on the modem that was impacted by the half-duplex constraint. If the NR modem was in a Tx mode, then the exclusion will be based on the periods configured for NR, and if the LTE modem was in a Tx mode, then the exclusion will be based on the periods configured for the LTE and so on.

New Priority Mapping Rule:

In Mode 2 resource selection, a resource is considered as occupied by an NR UE if the RSRP of its reservation message is above a certain threshold. This threshold may be dependent on a pair of priorities (i.e., the Tx and Rx priorities). However, in case of coexistence, an NR UE is expected to avoid collisions with LTE and NR priorities, where the LTE transmissions should be protected.

In accordance with an embodiment, new mapping rules are provided for mapping between the two systems' priorities. One method is to consider a one-to-one approach between the 8 LTE priorities of NR and LTE. Another method is a many to one approach, whereby all of the LTE priorities are mapped to a highest NR priority in order to minimize the impact on LTE UEs from NR transmissions in the coexistence band; especially since LTE UEs will not be able to detect NR reservations and avoid them.

Another method is to map the LTE priorities to a second highest NR priority so that high-priority NR messages (e.g., imminent collision message) may still be transmitted.

Another method is that a subset of LTE priorities can be mapped to one of the NR priorities. For example, the 4 highest LTE priorities can be mapped to the highest NR priority, whereas the following 4 priorities of LTE can be mapped to second highest NR priority, etc.

RSRP Thresholds:

RSRP thresholds play a role in the Mode 2 resource selection procedure. In particular, a resource is considered as occupied if the RSRP received from the UE that performed the reservation is above a pre-configured threshold. In the coexistence band, it may be beneficial to give more protection to LTE UEs since they will not be able to detect NR reservations and accordingly avoid them. To achieve this, a method is provided to configure two sets of RSRP thresholds when operating in the coexistence band. In particular, a first set can be used when deciding whether a resource is occupied or not by an NR UE, and a second set can be used when deciding whether a resource is occupied or not by an LTE UE.

The two sets can also be configured such that they can be derived from one another. For example, the LTE set of RSRP thresholds can be configured such that they are obtained from the NR set of RSRP thresholds by applying an offset. That is, to obtain the RSRP thresholds used for identifying LTE reservations, an offset of 3 dB may be subtracted from the RSRP thresholds that are used for NR reservations. This offers more protection to LTE UEs and minimizes the impact from NR UEs' transmissions on those of LTE UEs.

Impact of SCS and Subchannel Sizes:

Unlike LTE V2X, which uses 15 KHz SCS, NR V2X SCS can be as high as 60 KHz in frequency range 1 (FR1). In addition, the subchannel size configured for NR V2X can differ from that of LTE V2X. Subsequently, transmissions of NR and LTE UEs can be partially overlapping in the frequency domain. For example, an NR UE's transmission on subchannel X can overlap with an LTE transmission on 1 or 2 physical resource blocks (PRBs) and not the complete bandwidth. To address this issue, four methods are provided below:

First method: the SCS and subchannel sizes are unified when operating in the coexistence band. In particular, an NR UE can be configured to operate with two SCSs (one when operating in the NR band and another when operating in the coexistence band). That is, on a coexistence carrier, an NR UE should use 15 kHz SCS. In addition, the NR resource pool that falls in the coexistence band can be configured such that they have the same subchannel size as LTE. Subsequently, any overlap between NR and LTE UEs will occur across complete subchannels rather than a partial overlap and accordingly a legacy Mode 2 resource selection procedure can be considered.

Second method: a threshold based approach is provided, whereby an NR subchannel will be considered overlapping with an LTE transmission if the number of overlapping RBs is above the threshold. The threshold may be pre-configured per resource pool.

Third method: more protection can be given to RBs (e.g., 2 RBs) used by a control channel of LTE V2X. In particular, an NR transmission can be considered as overlapping with an LTE transmission if there is an overlap on at least one control PRB. However, if no overlap exists with the control channel of LTE, then the NR subchannel can be used, even while overlapping with the data part.

The threshold discussed in the 2nd method above can also be considered here. In particular, an NR transmission can be considered as unoccupied if 1) the overlap between the NR subchannel the data part of an LTE transmission is less than pre-configured number of RBs; and 2) there is no overlap between the NR transmission and the PRBs used to send the control signal by the LTE UE.

Fourth method: any partial overlap can be considered as a full overlap. For example, even if the transmission of the NR UE overlaps with another transmission by an LTE UE in only one PRB, this may still be considered as a full overlap and the resource can be relinquished by the NR UE based on the UEs' transmission priorities. This approach is relatively conservative and may provide more protection to LTE UEs at the expense of inefficient resource use in the coexistence band.

Impact of Slot Duration:

Unlike LTE, the slot duration of NR can be as low as 250 usec in FR1. In this case, an LTE reservation at a given subframe can overlap with up to 4 slots in the time domain. To address this issue, two methods are provided below.

First method: an NR UE may consider any overlap in the time domain as a full overlap and avoid any slots overlapping with LTE transmissions subject to a measured RSRP value and received priority.

Second method: an NR UE can treat a partial overlap between NR and LTE UEs in the coexistence band in the time domain differently from a full overlap. More specifically, an RSRP offset may be applied on the RSRP threshold used to identify occupancy of a resource based on an overlap duration. For example, a 3 dB offset can be added to the RSRP threshold that is used to determine the occupancy of a resource, if the NR slot overlaps with only a quarter of the subframe duration. A different offset can also be considered, if the slot duration overlaps half of the LTE subframe duration. In addition, if a UE is performing a transmission in two slots that overlap with the same LTE subframe, then a higher offset can be applied.

Impact of Resource Pool Configuration.

Since NR and LTE SLs are essentially different systems, they can be allocated different resources in time for SL transmission. For NR, the resource pool configuration indicates which slots can and/or cannot be used for SL transmission.

Figure 5A:
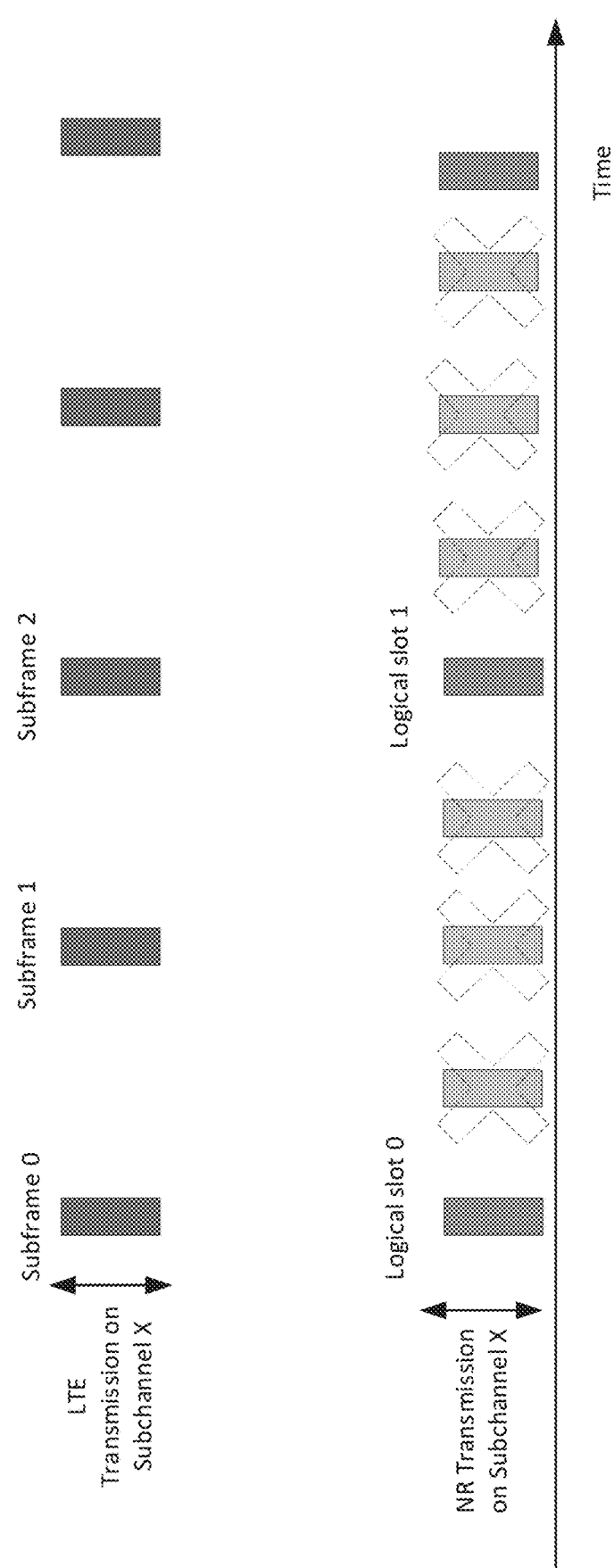
FIG. 5A illustrates overlap between NR and LTE in a time domain based on a resource pool configuration according to an embodiment.

FIG. 5A illustrates overlap between NR and LTE in a time domain based on a resource pool configuration according to an embodiment.

Referring to FIG. 5A, over a duration of 8 slots, the NR resource pool can be configured to use only every fourth slot (i.e., logical slots of the resource pool are not necessarily consecutive in time domain). In this example, the 2nd slot of NR will end up overlapping with the 2nd subframe of LTE.

In addition, in the frequency domain, the starting RB index of each subchannel can be different.

FIG. 5B illustrates overlap in a frequency domain based on subchannel sizes and SCS of LTE and NR according to an embodiment.

Referring to FIG. 5B, due to the difference in SCS and subchannel sizes between the NR and LTE systems, the starting RB for each subchannel may differ, resulting in partial and full overlap across multiple RBs and subchannels. For example, if the NR SL is configured with a subchannel size of 5 PRBs and SCS of 30 KHz and the subchannel size of LTE is 4 PRBs, then the 2nd subchannel (i.e., subchannel 1) of NR overlaps with 10 PRBs of the LTE SL (i.e., RBs 11 to 20). Consequently, subchannel 1 of NR ends up overlapping subchannels 2, 3, and 4 of LTE.

In accordance with the above-described embodiments, when performing Mode 2 resource selection of NR in the coexistence band and evaluating a potential resource for transmission, mapping functions are provided to identify the LTE single-subframe resource candidates that overlap with single-slot candidates resources for NR transmissions and determine whether these single-subframe candidates are occupied or not by LTE reservations. In addition, the mapping functions may be used to convert future periodic reservations of NR to the corresponding resources in the LTE resource pool.

To simplify a period conversion between NR and LTE, the available periods can be selected such that the periods of both LTE and NR are matched and that Pep of LTE matches that of the NR resource pool logical slot configuration.

The above-described updates for the Mode 2 resource selection are provided as follows, when operating in the coexistence band.

Step 1. Define a mapping function based on NR resource pool and LTE resource pool configurations that are to be used in a coexistence band. This function provides candidate single-subframe resource(s) of LTE that overlap with a single-slot resource of NR. In addition, it offers a conversion between the LTE and NR periods and priorities.

Step 2. A candidate single-slot resource for transmission $R_{x,y}$ is defined as a set of $L_{subCH}$ contiguous sub-channels with sub-channel x+j in slot $$t_y^{SL}$$

where j=0, . . . , $L_{subCH}$−1. The UE shall assume that any set of $L_{subCH}$ contiguous sub-channels included in the corresponding resource pool within the time interval [n+$T_1$, n+$T_2$] correspond to one candidate single-slot resource, where selection of $T_1$ is up to UE implementation under $0 \leq T_1 \leq T_{proc,1}$. If $T_{2min}$ is shorter than the remaining packet delay budget (in slots), then $T_2$ is up to UE implementation subject to $T_{2min} \leq T_2 \leq$ remaining packet budget (in slots); otherwise, $T_2$ is set to the remaining packet delay budget (in slots). The total number of candidate single-slot resources is denoted by $M_{total}$.

Step 3. The sensing window is defined by the range of slots [n−$T_0$, n−$T_{proc,0}$], where $T_0$ is defined above. The UE shall monitor slots that can belong to an SL resource pool within the sensing window, except for those in which its own transmissions occur. When operating in the coexistence band, a UE with a collocated LTE modem defines another sensing window for the detection of LTE reservations by the range of slots [n−$T_0$, n−$T_4$], where $T_4$ is the processing time to exchange the sensing information between the LTE and NR modems. The UE shall perform the behavior in the following steps based on the decoded PSCCH and the measured RSRP in these slots and the received LTE subframe reservations and their corresponding RSRP thresholds that are coming from the collocated LTE modem.

Step 4. The internal parameter Th($p_i$) is set to the corresponding value from higher layer parameter.

Step 5. The set $S_A$ is initialized to the set of all the candidate single-slot resources.

Step 6. The UE shall exclude any candidate single-slot resource $R_{x,y}$ from the set $S_A$, if it meets conditions (a and b) or c (below):

a. The UE has not monitored slot $$t_m^{SL}$$

in Step 2.

b. For any periodicity value allowed by higher layer parameter reservationPeriodAllowed and a hypothetical SCI format 0-1 received in slot $$t_m^{SL}$$

with "Resource reservation period" field set to that periodicity value and indicating all subchannels of the resource pool in this slot, condition c in Step 7 would be met.

c. Use the mapping function to obtain single-subframe resource $R_{x1,y1}$ that is overlapping with the single-slot resource $R_{x,y}$. Only a single candidate resource is required since the exclusion based on the half-duplex constraint targets a complete subframe with all its subchannels. In case of a periodic reservation, convert the NR Tx period to the corresponding period in LTE using the mapping function. If The UE LTE modem has not monitored subframe $$t_z^{SL}$$

in Step 2 and for any periodicity value $P_{step} \times k$, k is any value allowed by the higher layer parameter restrictResourceReservationPeriod, the subframe z+$P_{step} \times k \times q$ overlaps with $R_{x1,y1}$ or its periodic reservations until $C_{resel}$, q=1 or q=1, 2, . . . , Q if Q=1/k>1 and the first subframe given by z+$P_{step} \times k \times q$ falls after the sensing window as described in Step 5 of the Mode 4 resource selection procedure.

Step 7(a). The UE shall exclude any candidate single-slot resource $R_{x,y}$ from the set $S_A$ if it meets all the following conditions:

a. The UE receives an SCI format 0-1 in slot $$t_m^{SL},$$

and "Resource reservation period" field, if present, and "Priority" field in the received SCI format 0-1 indicate the values $P_{rsvp\_RX}$ and $prio_{RX}$, respectively according to 3GPP TR37.985;

b. The RSRP measurement performed, according to received SCI format 0-1, is higher than Th($prio_{RX}$);

c. The SCI format received in slot $$t_m^{SL}$$

or the same SCI format which, if and only if the "Resource reservation period" field is present in the received SCI format 0-1, is assumed to be received in slot(s)

$$t_{m+q \times P'_{rsvp\_RX}}^{SL}$$

determines according to 3GPP TR37.985 the set of resource blocks and slots which overlaps with $$R_{x,y+j \times P'_{rsvp\_TX}}$$

for q=1, 2, . . . , Q and j=0, 1, . . . , $C_{resel}$−1. Here, $$P'_{rsvp\_RX}$$

is $P_{rsvp\_RX}$ converted to units of logical slots, $$Q = \left\lceil \frac{T_{scal}}{P_{rsvp\_RX}} \right\rceil$$

if $P_{rsvp\_RX} < T_{scal}$ and $$n' - m \leq P'_{rsvp\_RX},$$

where $$t^{SL}_{n'} = n$$

if slot n belongs to the set $$\left(t^{SL}_0, t^{SL}_1, \ldots, t^{SL}_{T_{max}}\right);$$

otherwise, slot $$t^{SL}_{n'}$$

is the first slot after slot n belonging to the set $$\left(t^{SL}_0, t^{SL}_1, \ldots, t^{SL}_{T_{max}}\right);$$

otherwise Q=1. $T_{scal}$ is set to selection window size converted to units of msec.

Step 7(b). Use the mapping function to obtain a set of single-subframe resources {$R_{x1,y1}$, $R_{x2,y2}$, $R_{x3,y3}$, . . . } that overlap with the single-slot resource $R_{x,y}$. Herein, an overlap in even one PRB may be considered as a full overlap to protect the LTE UEs.

Obtain the converted period from the NR resource reservation to the corresponding LTE resource pool based on a configuration and apply the mapping function in order to obtain the LTE priority corresponding to the NR priority. The RSRP threshold used to identify an occupied resource by an overlapping UE is set to $Th_2(prio_{RX})$ in case of an overlap with an LTE reservation ($Th_2(prio_{RX})$ and can be configured separately or as an offset applied to $Th(prio_{RX})$ or by applying a mapping rule as discussed hereinabove). $prio_{RX}$ can be obtained from the LTE reservation priority based on a pre-configured mapping rule. The UE should then apply Step 6 of the Mode 4 resource selection procedure of LTE for the identified single-subframe resources within the set. If any of the single-subframe resources is determined as occupied by Step 6 of the Mode 4 resource selection procedure, then the single-slot resource $R_{x,y}$ is excluded from the set $S_A$.

Step 8. If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with Step 3.

Step 9. The UE reports the remaining candidate single-slot resources of set $S_A$ to higher layers, and according to the PRS configuration, the high layer selects a candidate resource for PRS/CSI-RS for the SL positioning.

In accordance with above described embodiments, the Mode 2 resource selection procedure may be updated to consider the impact of LTE reservations on the set of available resources. Accordingly, an NR UE with a collocated LTE modem operating in the coexistence band will be able to detect and avoid future reservations by LTE UEs.

Further, the impact of the half-duplex constraint on resource exclusion may be considered for LTE and NR modems.

A threshold to identify an overlap in the time domain between LTE and NR UEs can be either based on any partial overlap or if the overlapping happens across a preconfigured percentage of the LTE subframe. The threshold to identify an overlap in the frequency domain between LTE and NR UEs can also be based on any partial overlap or if the overlapping is above a certain threshold.

Additionally, mapping functions are provided to map the LTE and NR periodicities and priorities.

The RSRP thresholds that may be used to identify the occupancy of LTE resources can be pre-configured separately for the coexistence band and can be obtained by applying an offset to the ones used by NR UEs.

Further, NR SCS and the subchannel size may be restricted to the ones used by the LTE when an NR UE is operating in the coexistence band.

Figure 6:
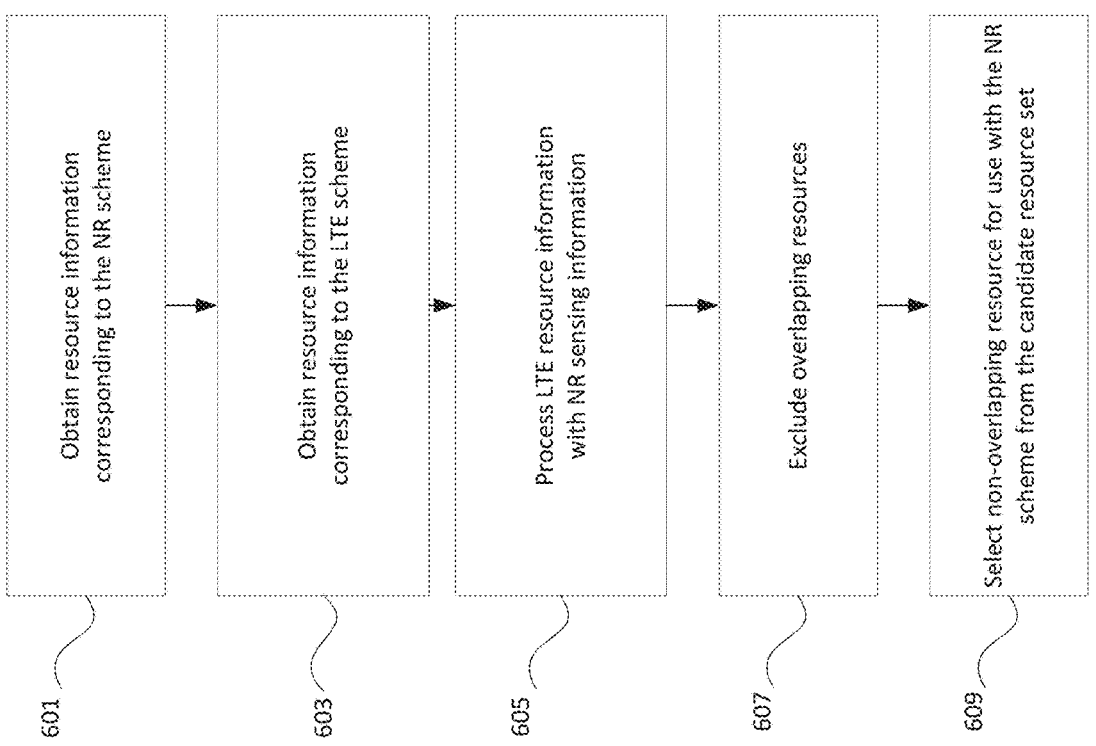
FIG. 6 is flowchart illustrating a Mode 2 procedure for resource selection in a coexistence band, according to an embodiment.

FIG. 6 is flowchart illustrating a Mode 2 procedure for resource selection in a coexistence band, according to an embodiment.

Referring to FIG. 6, in step 601, an NR UE including LTE and NR modems obtains, using the NR modem, a set of NR candidate resources for resource selection within a resource selection window, and NR sensing information for potential resources for transmission.

In step 603, using the LTE modem, the NR UE obtains LTE resource information corresponding. For example, the LTE resource information may include LTE sensing information and future reservations.

In step 605, the NR UE processes the LTE resource information with the NR sensing information. For example, the NR UE maps the LTE resource information to the NR scheme according to a mapping rule. In case of coexistence, since the NR UE is expected to avoid collisions with LTE and NR priorities, where the LTE transmissions should be protected, mapping rules are provided for mapping between the two systems' priorities, e.g., a one-to-one approach or a many to one approach, as described above.

In step 607, the NR UE excludes resources, which are identified as occupied (i.e., overlapping) based on the processed information, from the NR set of candidate resources for resource selection.

In step 609, the NR UE selects a non-overlapping resource for use with the NR scheme from resources remaining in the NR candidate resource set.

In the method illustrated in FIG. 6, the processed mapped resource information may be passed from a physical layer to a higher layer for performing the selecting, or the mapped sensing information may be passed form the physical layer to the higher layer for performing the processing and the selecting.

Simplified Version of the Mode 2 Procedure for Resource Selection in a Coexistence Band The inclusion of LTE sensing information and future LTE reservations/transmissions in phase 1 of the Mode 2 resource selection procedure may significantly increase the resource selection complexity and subsequently impact latency.

To obviate this issue, in accordance with an embodiment of the disclosure, phase 1 of the Mode 2 and Mode 4 resource selection procedures may be applied independently (only the priorities, periodicities and resource selection windows are aligned).

Regarding finding resources for aperiodic traffic, it can be done by finding the intersection set of the two candidate sets after mapping.

Regarding finding candidate resources for a periodic NR reservation, it can be handled directly by the Mode 4 resource selection procedure by triggering sensing based on a dummy periodic reservation with periodicity equivalent to NR, or handled by validating each of the candidate periodic resources identified by phase 1 of the Mode 2 resource selection against the candidate resource set obtained from the Mode 4 resource selection procedure of LTE.

FIG. 7 is flowchart illustrating a simplified version of the Mode 2 procedure for resource selection in a coexistence band, according to an embodiment.

Referring to FIG. 7, in step 701, an NR UE performs phase 1 of the Mode 2 for resource selection.

In step 703, the NR UE maps the NR priority and periodicity to corresponding LTE values.

In step 705, the NR UE performs phase 1 of the Mode 4 resource selection procedure with an aligned resource selection window.

In step 707, the NR UE maps the candidate LTE resource set to that of NR and excludes non-overlapping NR resources.

In step 709, the NR UE determines if enough resources remain in a candidate set.

If enough resources remain, the NR UE performs phase 2 of the Mode 2 for resource selection in step 711. However, there are not enough resources remaining in the candidate set, the NR UE may drop the transmission, pass the set of candidate resources as is (even if it is less than X %), rerun the Mode 2 resource selection procedure with a higher target of candidate resources percentage, or return some of the excluded resources back into the candidate resource set in step 713.

The above-described simplified version of the Mode 2 procedure will be described in more detail below. More specifically, in accordance with an embodiment of the disclosure, the following steps may be performed in case of coexistence.

Step 1. The NR UE can perform the Mode 2 resource selection procedure for NR UEs based on sensing and resource reservations detected by the NR modem only and accordingly identify a set of candidate resources.

Step 2. The NR UE uses its LTE modem to perform the Mode 4 resource selection procedure while aligning resource selection windows of the Mode 2 and the Mode 4 procedure in order to obtain a set of single-subframe-single-subchannel candidate resource set. When applying the Mode 4 procedure, the periodicity and the priority considered in the Mode 4 resource selection are obtained from a mapping function. In particular, a UE applies a pre-defined mapping procedure between the NR priority and the corresponding LTE priority. Similarly, a UE applies a pre-defined mapping procedure between the NR periods to obtain the corresponding LTE periodicity in case of a periodic reservation.

Step 3. In case of aperiodic traffic, for each element (e.g., a single-slot candidate resource element) in the set obtained by the Mode 2 resource selection procedure, a mapping function may be applied to identify an overlapping set of single-subframe-single-subchannel candidate resources in the LTE subframe. Subsequently, the single-slot candidate resource element is not excluded, if all the overlapping single-subframe-single-subchannel candidate resources are available in the set $S_B$ after Mode 4 resource selection. An overlapping resource may be a full overlap or a partial overlap in a single RB or more as described above.

Step 4. In case of a periodic reservation two approaches are provided:

Approach 1. For each element in the set obtained by the Mode 2 resource selection procedure, the NR UE first obtains a periodic single-slot candidate resource elements for the periodic reservation until Crew is reached (i.e., it follows the current Mode 2 resource selection procedure with the given period as an input).

Subsequently, a mapping function is applied to identify an overlapping set of single-subframe-single-subchannel candidate resources in the LTE subframe that overlap with either the first instance or the periodic instances of the candidate single-slot resource elements. Thereafter, the single-slot candidate resource element is not excluded, if all the overlapping single-subframe-single-subchannel candidate resources are available in the set $S_B$ after Mode 4 resource selection. In this case, the period used for the LTE Mode 4 procedure may be set to zero (aperiodic). The impact of periodicity will be handled by the mapping function that finds the corresponding single-subframe candidates that are overlapping with the NR transmissions and their periodic versions.

Approach 2. The period used by the NR UE is converted by a mapping function and then pushed to the Mode 4 resource selection procedure. Using this approach, each candidate resource after Mode 4 procedure will be able to accommodate the periodic reservation. Subsequently, for each element (single-slot candidate resource element) in the set obtained by the Mode 2 resource selection procedure, a mapping function is applied to identify an overlapping set of single-subframe-single-subchannel candidate resources in the LTE subframe.

Thereafter, the single-slot candidate resource element is not excluded, if all of the overlapping single-subframe-single-subchannel candidate resources are available in the set $S_B$ (i.e., the candidate resource set) after Mode 4 resource selection. Here, the periodic versions of the NR reservation are not considered because the periodicity is already captured in the set $S_B$ obtained after Mode 4. This is similar to the aperiodic case since the impact of periodicity is already captured by the LTE Mode 4 resource selection procedure through the modified period.

In addition, the periodicity of NR and LTE can be matched to simplify the Mode 4 resource selection procedure because the NR system has more options for the period values than their LTE counterpart (e.g., NR can have a period of 3 ms but LTE is limited to 20, 50, and multiples of 100 ms). Hence, if the periods of both systems are selected to be the same, this can simplify the mapping and resource exclusion step.

Step 5. The NR UE then passes the remaining resources after the exclusion based on the output of the Mode 4 procedure to the higher layer for resource selection.

Step 6. In case of insufficient resources being passed to the higher layer (i.e., if the number of passed resources is less than the pre-configured X %), at least one of the following procedures can be performed:

Procedure 1. A UE can bring back some of the resources that were excluded due to the Mode 4 resource selection procedure output. However, in this case the performance of LTE UEs may be impacted.

Procedure 2. A UE can rerun the resource selection procedure of Mode 2 with a higher X % than the needed value. For instance, if 20% is needed then it can rerun the Mode 2 resource selection procedure with a target of 50% of the total resources. Subsequently, the UE performs the intersection between the resulting set of candidate resources with that coming from the LTE. This may impact the performance of NR UEs in the coexistence band but not the LTE ones. In addition, this may be applied if the remaining resources after the resource selection procedure of Mode 4 can satisfy the X %. Otherwise, even if the UE passes 100% of the candidate resources from the Mode 2 procedure, they will still be excluded by the Mode 4 resource selection procedure.

Procedure 3. A UE can refrain from performing the transmission due to the insufficient number of candidates being passed to the higher layer.

Procedure 4. Pass the remaining set to the higher layer for selection even if it is less than X %.

In Approaches 1 and 2 above, the exclusion of NR resources after the Mode 2 resource selection may be performed if any of their overlapping LTE resources is occupied. This restriction can also be relaxed by considering a weighted average approach. More specifically, an NR resource, after the Mode 2 resource selection is completed, can be excluded if the Z % of the overlapping LTE resources are equipped. This may reduce the chances of resource exclusion, but may increase the chances of an NR UE selecting a resource that is occupied by an LTE UE.

Figure 8:
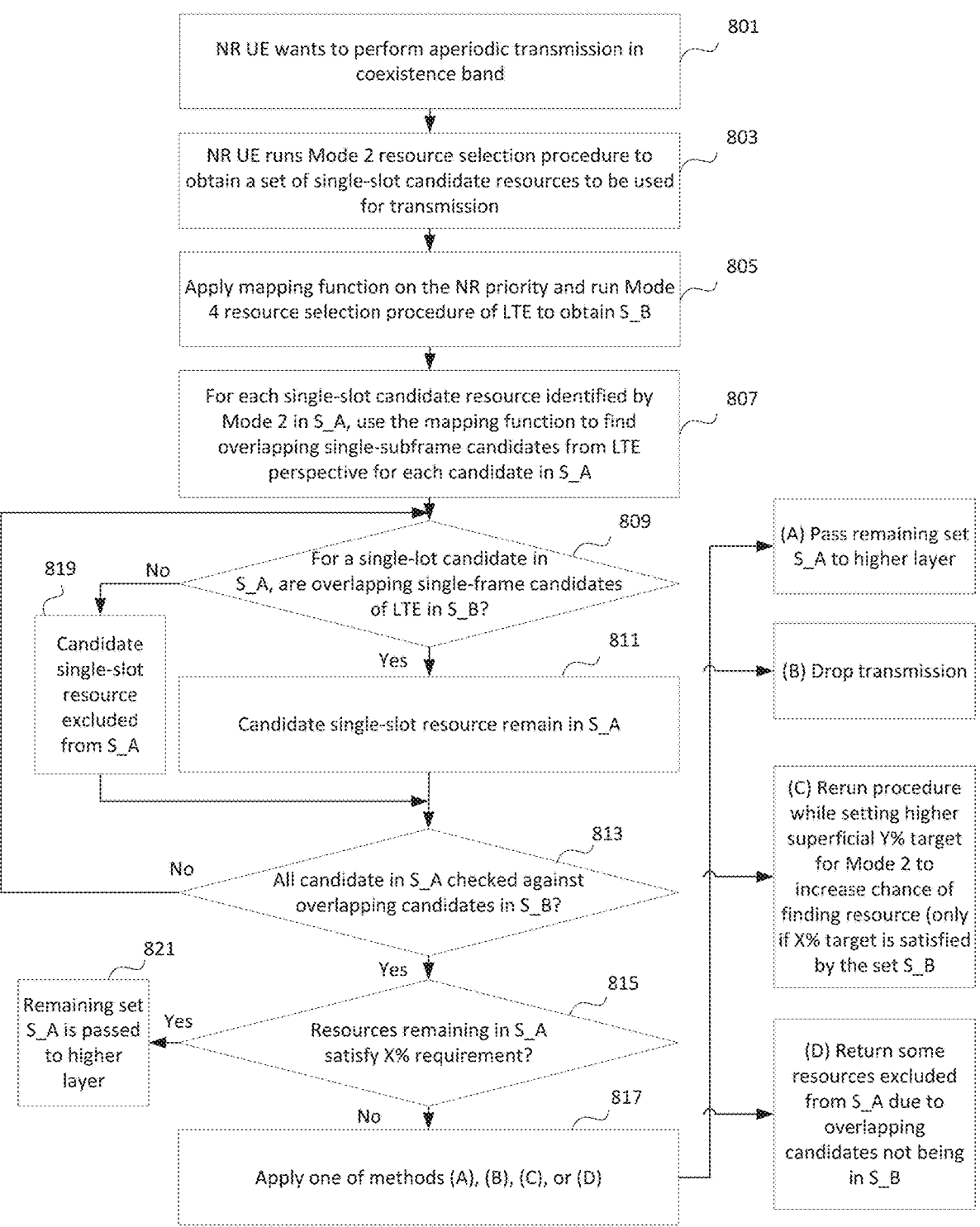
FIG. 8 is flowchart illustrating a simplified version of the Mode 2 procedure for resource selection in a coexistence band, in case of aperiodic traffic, according to an embodiment.

FIG. 8 is flowchart illustrating a simplified version of the Mode 2 procedure for resource selection in a coexistence band, in case of aperiodic traffic, according to an embodiment.

Referring to FIG. 8, in step 801, an NR UE wants to perform aperiodic transmission in the coexistence band.

In step 803, the NR UE runs a Mode 2 resource selection procedure to obtain a set of single-slot candidate resources to be used for transmission ($S_A$).

In step 805, the NR UE applies a mapping function on the NR priority and runs Mode 4 resource selection procedure of LTE to obtain $S_B$.

In step 807, for each single-slot candidate resource identified by the Mode 2 in $S_A$, the NR UE uses the mapping function to find overlapping single-subframe candidates from LTE perspective for each candidate in $S_A$.

In step 809, for a candidate single-slot resource in $S_A$, the NR UE determines if there are overlapping single-frame candidates of LTE in $S_B$. If there are overlapping single-frame candidates of LTE in $S_B$, the NR UE leaves the candidate single-slot resource in $S_A$ in step 811. However, if there are no there are overlapping single-frame candidates of LTE in $S_B$, the NR UE excludes the candidate single-slot resource from $S_A$ in step 819.

In step 813, the NR UE determines if all of the candidate resources in $S_A$ have been checked against overlapping resources in $S_B$. If all of the candidate resources in $S_A$ have not been checked in step 813, the process returns to step 809. However, if all of the candidate resources in $S_A$ have been checked in step 813, the NR UE determines if the remaining resources in $S_A$ satisfy X % requirement in step 815.

When the NR UE determines that the remaining resources in $S_A$ satisfy X % requirement in step 815, the remaining resources in $S_A$ are passed to a higher layer in step 821.

However, when the NR UE determines that the remaining resources in $S_A$ do not satisfy X % requirement in step 815, one of the following method is performed in step 817:

A) the remaining resources in $S_A$ are passed to the higher layer,

B) transmission is dropped;

C) the procedure is rerun, while setting higher superficial Y % target for Mode 2 to increase chance of finding resource (only if X % target is satisfied by the set $S_B$); or D) some of the resources excluded from $S_A$ due to overlapping candidates not being in $S_B$ in steps 809 and 819 are returned to $S_A$.

Figure 9:
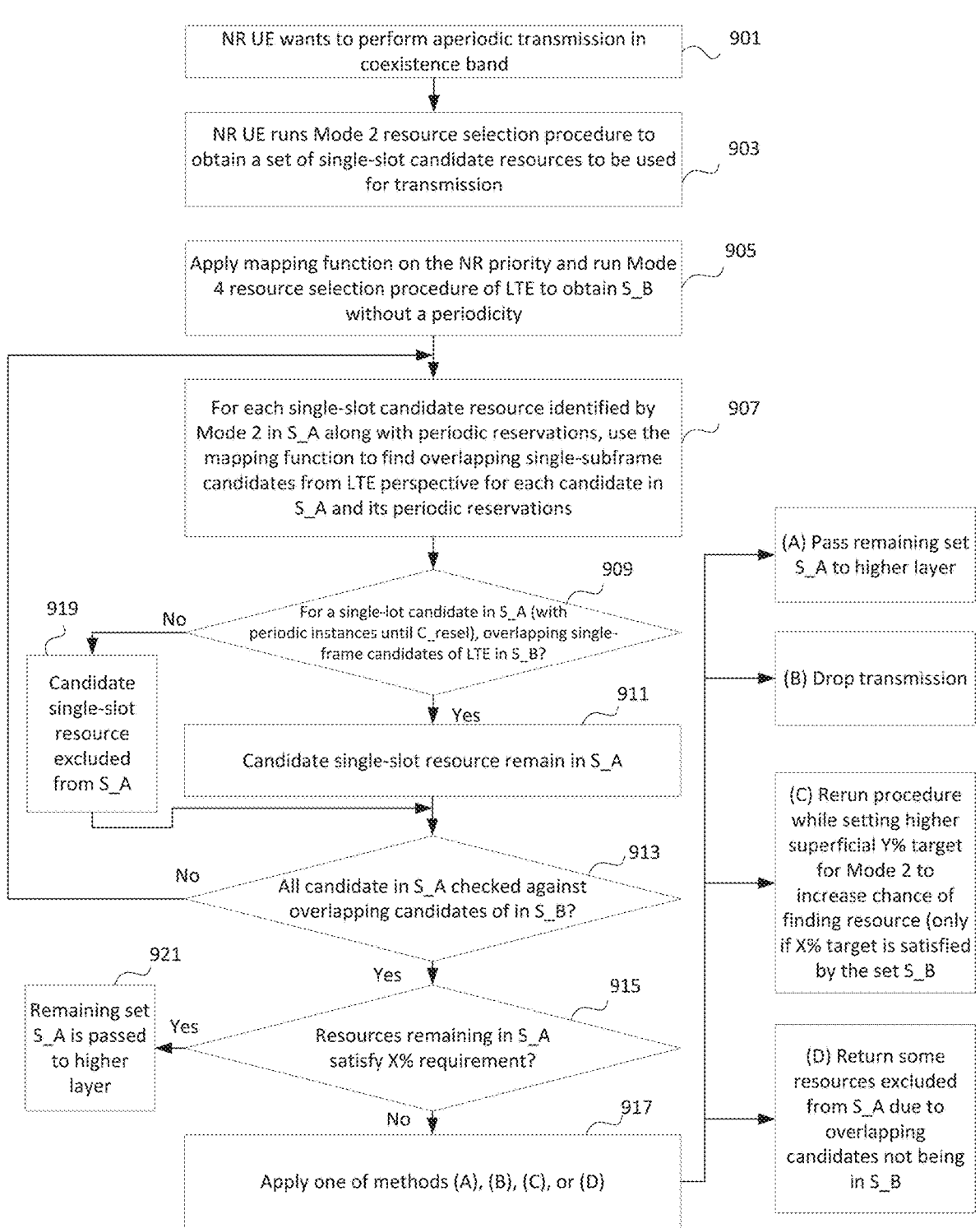
FIG. 9 is flowchart illustrating Approach 1 of the Mode 2 procedure for resource selection in a coexistence band, in case of periodic traffic, according to an embodiment.

FIG. 9 is flowchart illustrating Approach 1 of the Mode 2 procedure for resource selection in a coexistence band, in case of periodic traffic, according to an embodiment.

Referring to FIG. 9, in step 901, an NR UE wants to perform aperiodic transmission in the coexistence band.

In step 903, the NR UE runs a Mode 2 resource selection procedure to obtain a set of single-slot candidate resources to be used for transmission ($S_A$).

In step 905, the NR UE applies a mapping function on the NR priority and runs Mode 4 resource selection procedure of LTE to obtain $S_B$ without a periodicity.

In step 907, for each single-slot candidate resource identified by Mode 2 in $S_A$ along with periodic reservations, the NR UE uses the mapping function to find overlapping single-subframe candidates from the LTE perspective for each candidate in $S_A$ and its periodic reservations.

In step 909, for a candidate single-slot resource in $S_A$, the NR UE determines if there are overlapping single-frame candidates of LTE in $S_B$. If there are overlapping single-frame candidates of LTE in $S_B$, the NR UE leaves the candidate single-slot resource in $S_A$ in step 911. However, if there are no there are overlapping single-frame candidates of LTE in $S_B$, the NR UE excludes the candidate single-slot resource from $S_A$ in step 919.

In step 913, the NR UE determines if all of the candidate resources in $S_A$ have been checked against overlapping resources in $S_B$. If all of the candidate resources in $S_A$ have not been checked in step 913, the process returns to step 907. However, if all of the candidate resources in $S_A$ have been checked in step 913, the NR UE determines if the remaining resources in $S_A$ satisfy X % requirement in step 915.

When the NR UE determines that the remaining resources in $S_A$ satisfy X % requirement in step 915, the remaining resources in $S_A$ are passed to a higher layer in step 921.

However, when the NR UE determines that the remaining resources in $S_A$ do not satisfy X % requirement in step 915, one of the following method is performed in step 917:

A) the remaining resources in $S_A$ are passed to the higher layer;

B) transmission is dropped;

C) the procedure is rerun, while setting higher superficial Y % target for Mode 2 to increase chance of finding resource (only if X % target is satisfied by the set $S_B$); or D) some of the resources excluded from $S_A$ due to overlapping candidates not being in SK in steps 909 and 919 are returned to $S_A$.

Figure 10:
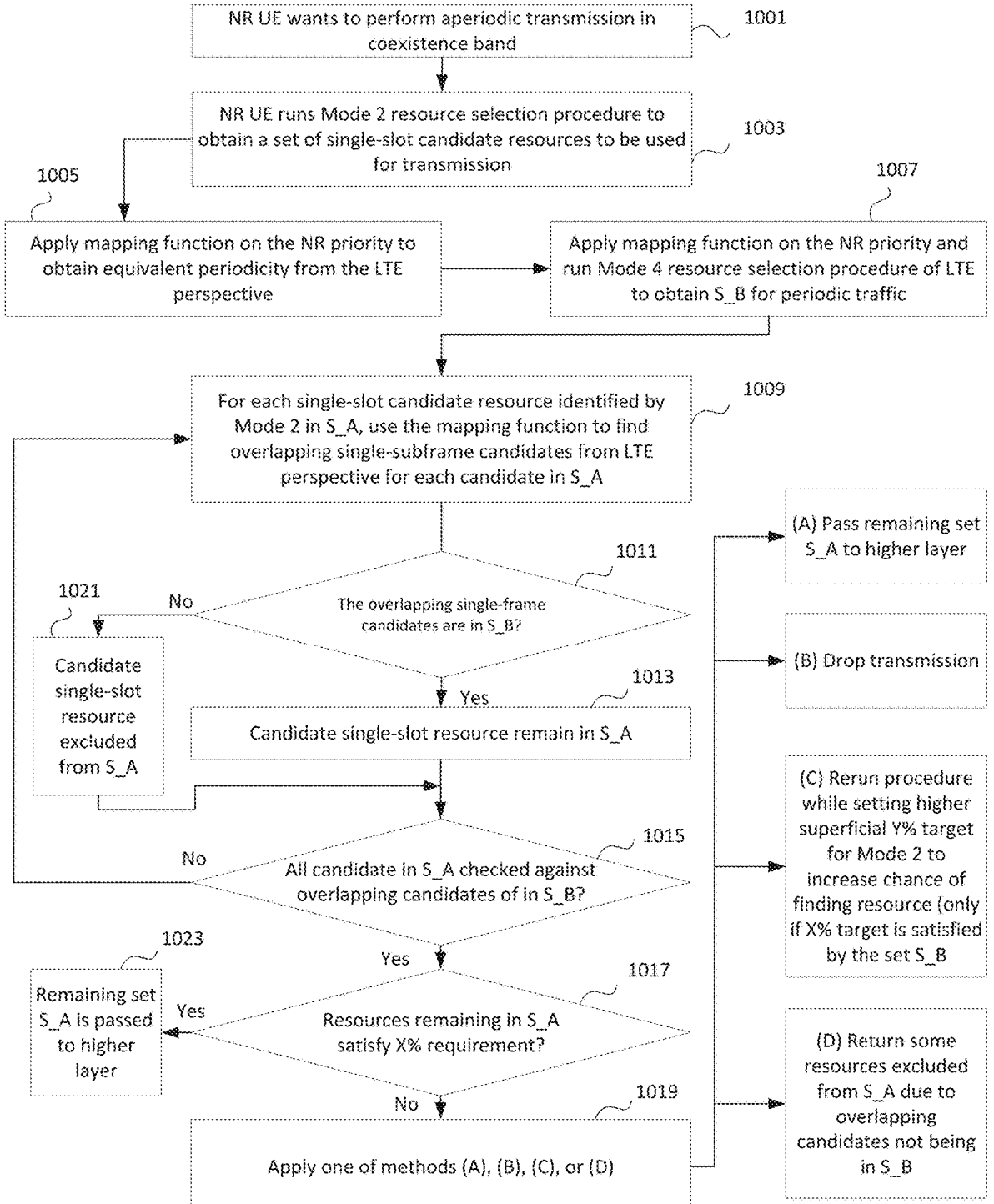
FIG. 10 is flowchart illustrating Approach 2 of the Mode 2 procedure for resource selection in a coexistence band, in case of periodic traffic, according to an embodiment.

FIG. 10 is flowchart illustrating Approach 2 of the Mode 2 procedure for resource selection in a coexistence band, in case of periodic traffic, according to an embodiment.

Referring to FIG. 10, in step 1001, an NR UE wants to perform aperiodic transmission in the coexistence band.

In step 1003, the NR UE runs a Mode 2 resource selection procedure to obtain a set of single-slot candidate resources to be used for transmission (Si).

In step 1005, the NR UE applies a mapping function on the NR priority to obtain equivalent periodicity from the LTE perspective.

In step 1007, the NR UE applies a mapping function on the NR priority and runs Mode 4 resource selection procedure of LTE to obtain $S_B$ for the period traffic.

In step 1009, for each single-slot candidate resource identified by Mode 2 in $S_A$, the NR UE uses the mapping function to find overlapping single-subframe candidates from the LTE perspective for each candidate in $S_A$.

In step 1011, for a candidate single-slot resource in $S_A$, the NR UE determines if there are overlapping single-frame candidates of LTE in $S_B$. If there are overlapping single-frame candidates of LTE in $S_B$, the NR UE leaves the candidate single-slot resource in $S_A$ in step 1013. However, if there are no there are overlapping single-frame candidates of LTE in $S_B$, the NR UE excludes the candidate single-slot resource from $S_A$ in step 1021.

In step 1015, the NR UE determines if all of the candidate resources in $S_A$ have been checked against overlapping resources in $S_B$. If all of the candidate resources in $S_A$ have not been checked in step 1015, the process returns to step 1009. However, if all of the candidate resources in $S_A$ have been checked in step 1015, the NR UE determines if the remaining resources in $S_A$ satisfy X % requirement in step 1017.

When the NR UE determines that the remaining resources in $S_A$ satisfy X % requirement in step 1017, the remaining resources in $S_A$ are passed to a higher layer in step 1023.

However, when the NR UE determines that the remaining resources in $S_A$ do not satisfy X % requirement in step 1017, one of the following method is performed in step 1019:

A) the remaining resources in $S_A$ are passed to the higher layer;

B) transmission is dropped;

C) the procedure is rerun, while setting higher superficial Y % target for Mode 2 to increase chance of finding resource (only if X % target is satisfied by the set $S_B$); or D) some of the resources excluded from $S_A$ due to overlapping candidates not being in $S_B$ in steps 1011 and 1021 are returned to $S_A$.

In accordance with the above-described embodiments, to select resources for an aperiodic/periodic NR transmission, an NR UE can run the Mode 2 resource selection procedure and the Mode 4 resource selection procedure and accordingly identify an intersecting set of candidate resources to pass to the higher layer for selection.

The NR UE can use a mapping function to identify the set of overlapping resources with each element in its candidate resource set and accordingly check whether they are occupied or not. The mapping function to obtain the overlapping resources in case of a periodic transmission can be either done before running the Mode 4 resource selection procedure or it can be applied on the candidate resource set obtained from the Mode 4 resource selection procedure.

If there are not enough candidate resources are available to pass to the higher layer after exclusion based on the Mode 4 resource selection procedure, an NR UE can drop the transmission, pass the set of candidate resources as is (even if it is less than X %), rerun the Mode 2 resource selection procedure with a higher target of candidate resources percentage, or return some of the excluded resources back into the candidate resource set.

Resource Reselection and Pre-Emption Procedure

In a coexistence band, LTE UEs are not expected to be aware of NR reservations and thus high chances of collisions can occur between the two systems. Further, as LTE UEs are expected to transmit basic safety messages, these transmissions should be protected.

In accordance with an embodiment of the disclosure, an NR UE can trigger a resource reselection or pre-emption based on new upcoming reservations from a collocated LTE modem subject to processing time requirements. More specifically, if the LTE modem detects a future LTE reservation, this reservation may be passed to the NR modem. Thereafter, the NR modem may apply a mapping function to identify the overlapping one or more single-slot resources that are either selected or reserved for its future transmission.

In addition, the NR modem may apply a mapping function to obtain the priority of the LTE transmission or reservations. Subsequently, if the priority of the LTE transmission or reservation is above a pre-configured threshold and it is overlapping with a selected resource(s) by the NR modem, then the NR modem triggers a resource reselection. However, if the LTE resource overlaps with an NR resource that is already signaled by the NR modem, then a pre-emption is triggered.

Different prioritization conditions can be applied for the cases of Tx/Tx and Tx/Rx overlapping between NR and LTE modems. More specifically, the priority of receiving a transmission by the LTE modem in the coexistence band can be treated separately from the priority of the LTE modem performing a transmission in the coexistence band. An NR UE may assign a higher priority to LTE Rx since these transmissions are originating from a neighboring UE that is not aware of NR reservations. However, LTE transmissions will be originating from the collocated modem, thus the LTE modem may be able to trigger resource reselection in order to avoid colliding with the NR transmission and can be treated with a lower priority.

If an NR UE does not perform reselection or pre-emption, it can still signal an indication to the LTE modem of upcoming collisions and subsequently can trigger a resource reselection from the LTE modem side.

In addition, the indication of a future NR reservation can also originate from the NR modem and be passed to the LTE modem in order to trigger reselection if needed. In such a case, a mapping function may be used to obtain the overlapping LTE resources and the equivalent LTE priority of the NR transmission.

In accordance with the above-described embodiments, an NR UE can trigger resource reselections and preemptions based on reservations indicated by the LTE modem subject to processing time requirements.

The overlapping NR resources with the intended LTE transmission may be obtained by using a mapping function. In addition, the mapping function may also provide the equivalent priority of the LTE transmission.

The priority of Tx and Rx reservations identified by the LTE modem and passed to the NR modem to trigger a reselection/pre-emption can be treated differently.

An LTE UE can trigger resource reselections based on reservations indicated by the NR modem subject to processing time requirements.

Further, the overlapping LTE resources with the intended NR transmissions may be obtained by using a mapping function. The mapping function may also provide the equivalent priority of the LTE transmission.

Limited Transmissions in Coexistence Band Procedure

When NR UEs coexist with LTE UEs, it is expected that LTE UEs will have a higher priority. Thus, the impact on the performance of LTE devices should be minimized. In other words, the interference incurred by the LTE UEs due to NR transmissions should be minimized.

To achieve this, in accordance with an embodiment of the disclosure, control and data channels of NR UEs may be separated, whereby only the control channel is sent in the coexistence band (or only the control and feedback channels are allowed to be sent in the coexistence band). In this case, an NR UE can send only the PSCCH or the PSCCH and the PSFCH in the coexistence band (e.g., to announce a future reservation in the non-coexistence band or receive ACK/NACK or conflict indication), thus reducing the impact on LTE UEs, when only PSCCH is sent in the coexistence band.

Figure 11:
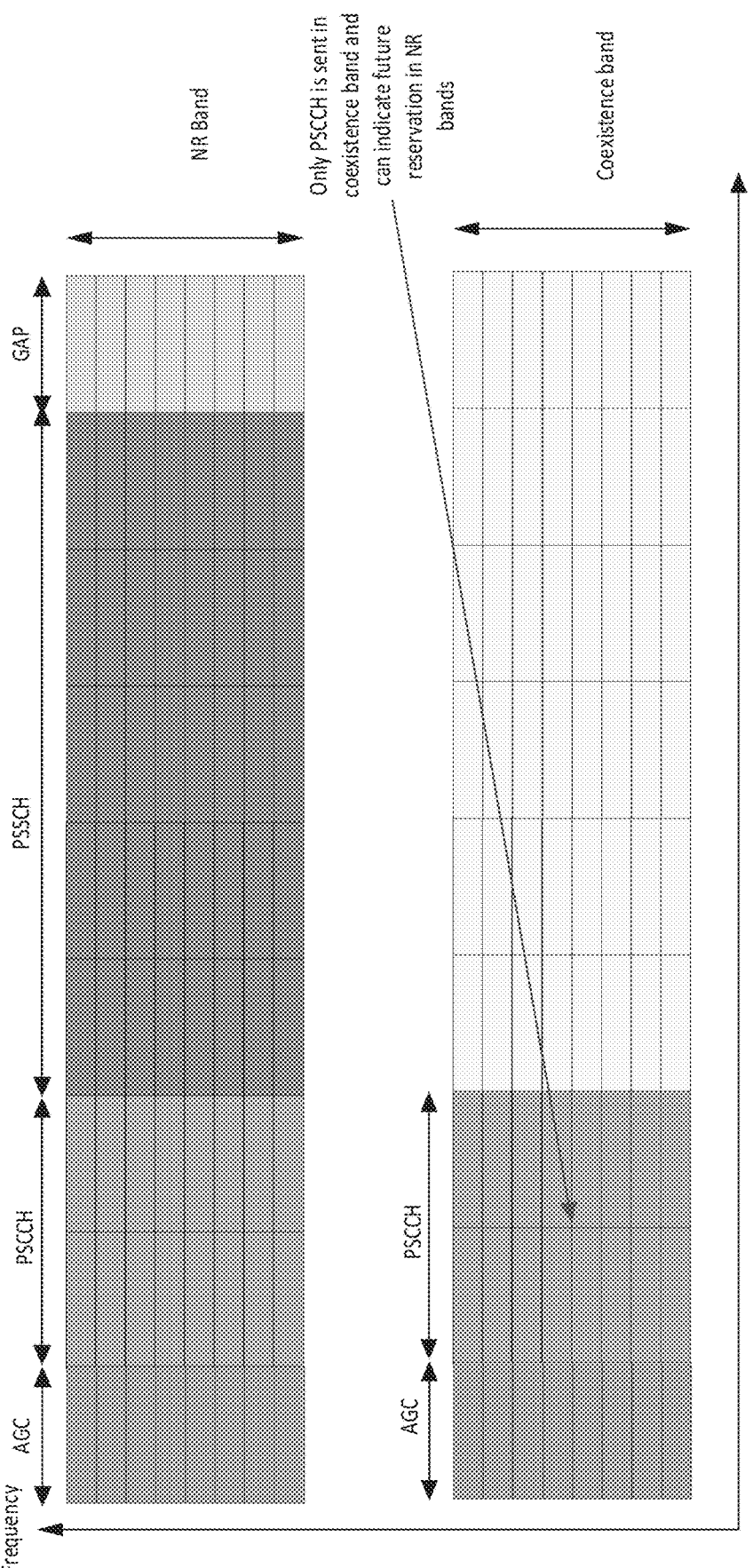
FIG. 11 illustrates an example of sending only NR physical SL control channel (PSCCH) in a coexistence band in order to limit the impact on LTE UEs, according to an embodiment.

FIG. 11 illustrates an example of sending only NR PSCCH in a coexistence band in order to limit the impact on LTE UEs, according to an embodiment.

Referring to FIG. 11, interference incurred by LTE UEs will be minimized since the interference will occur only on a small fraction of the LTE subframe. Hence, a transmission by an LTE UE can still be successful despite the interference. This feature can also be enabled/disabled per resource pool. In addition, it can be limited to UEs with low priority. For example, UEs with relatively low priorities will be limited to sending only their PSCCH in the coexistence band, whereas UEs with relatively high priorities will be able to send their PSCCH and PSSCH in the coexistence band in order to increase their data rate.

In accordance with the above-described embodiments, to minimize the impact on LTE UEs, NR UEs can be limited to sending only their control channel signaling (i.e., PSCCH only or PSCCH and PSFCH) in the coexistence band. The PSCCH sent in the coexistence band can be used to perform future reservations in the NR band(s).

Procedure for when Subchannel Size is Larger than LTE Bandwidth

When NR UEs coexist with LTE UEs in the same band, a problem may arise due to the limited bandwidth of the coexistence band. This may be due to higher SCSs being allowed for NR SL than for LTE. For example, 120 KHz SCS can be used by NR, whereas LTE is limited only to 15 KHz SCS.

In such a case, even with the minimum subchannel size allowed, the NR UEs may not be able to transmit in the coexistence band. For example, if the coexistence band is 5 MHz and if NR SCS is 60 KHz, the minimal subchannel size is given by 10 PRBs, which translates to a bandwidth of 7.2 MHz. Accordingly, NR UEs may not be able to transmit and realize potential gains of coexistence.

To address this drawback, in accordance with an embodiment of the disclosure, different options are provided as follows:

Option 1: The maximum SCS allowed for the coexistence band can be pre-configured. In this case, the NR UE will be expected to support two SCSs, one for the coexistence band and another for the NR band. A UE is expected to either operate based on the lower SCS in order to prevent the need for simultaneous transmission of different SCS. In particular, if a slot is used based on the lower SCS, then the corresponding ones in the larger SCS are expected to be blocked (i.e., a UE is not expected to receive or transmit during these slots). For example, if an SCS of 15 KHz is used for the coexistence band while an SCS of 60 KHz is used for the NR Band, if a UE transmits in slot X in the coexistence band, it is not expected to transmit or receive in the corresponding four slots of the NR band. Since the UE is expected to operate with 2 SCS, it is expected to handle 2 DFNs and slot indices simultaneously.

Option 2: A lower subchannel size can be allowed for coexistence band. For example, the range of subchannel sizes configured for the coexistence band can be different from those used in the NR band.

Option 3: If there are several LTE channels that are adjacent (e.g., 3 10-MHz LTE channels), the described framework can be expanded by having the NR UE performing sensing on each carrier using the LTE modem. Subsequently, the NR UE can jointly use the adjacent subchannels of the LTE when transmitting in the coexistence band. For example, two 10-MHz adjacent LTE channels can be combined together and considered as a coexistence band of 20-MHz, thus allowing NR transmissions with larger SCSs.

In accordance with the above-described embodiments, a UE may operate with 2 SCS simultaneously, whereby a lower SCS can be used in the coexistence band.

Additionally, a certain subchannel size can be configured separately for the coexistence resource pool, which is below the minimum number of subchannel size.

Figure 12:
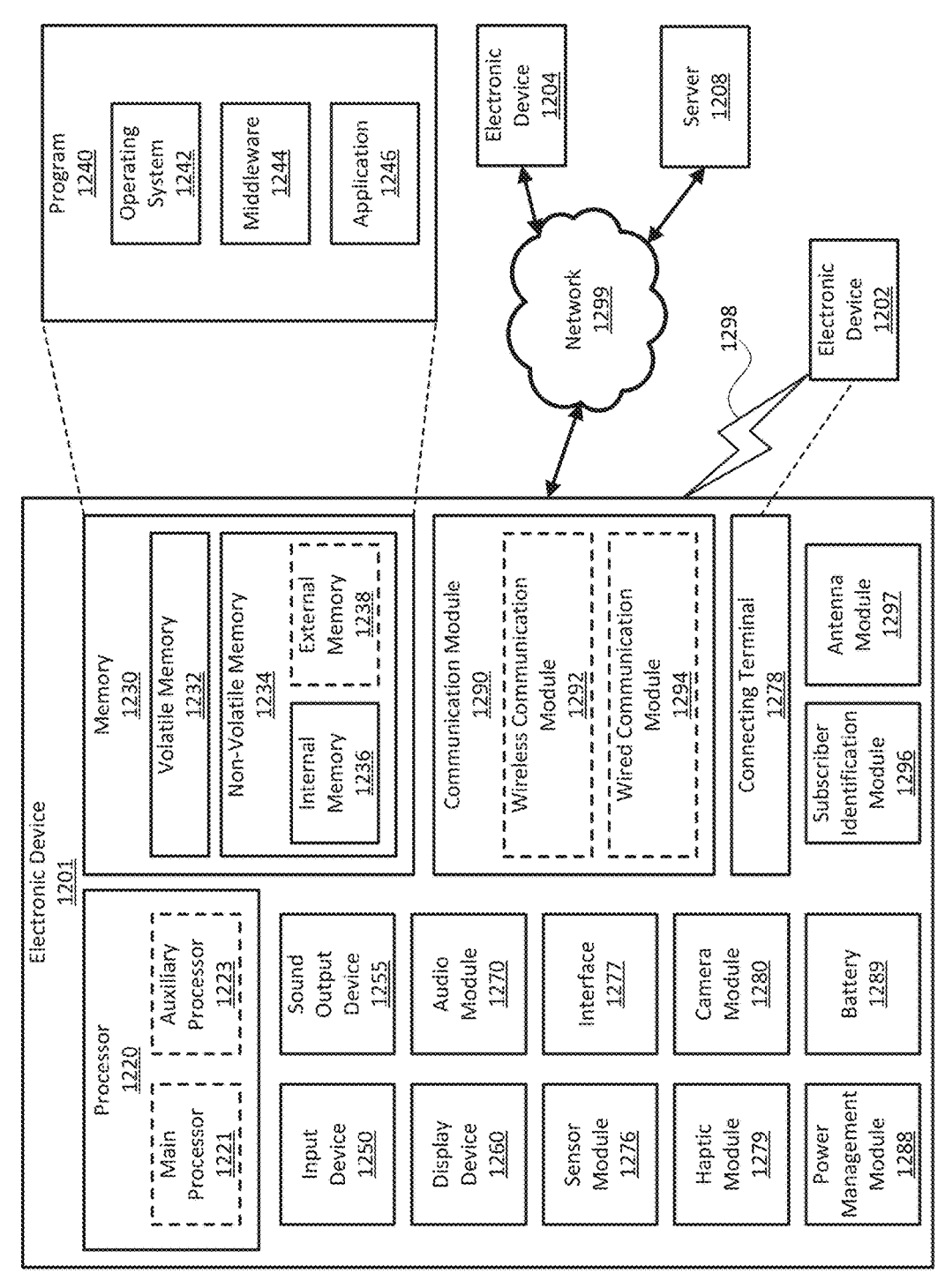
FIG. 12 is a block diagram of an electronic device in a network environment, according to an embodiment.

FIG. 12 is a block diagram of an electronic device in a network environment 1200, according to an embodiment.

Referring to FIG. 12, an electronic device 1201, e.g., an NR UE, in a network environment 1200 may communicate with an electronic device 1202 via a first network 1298 (e.g., a short-range wireless communication network), or an electronic device 1204 or a server 1208 via a second network 1299 (e.g., a long-range wireless communication network). The electronic device 1201 may communicate with the electronic device 1204 via the server 1208. The electronic device 1201 may include a processor 1220, a memory 1230, an input device 1240, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) card 1296, or an antenna module 1294. In one embodiment, at least one (e.g., the display device 1260 or the camera module 1280) of the components may be omitted from the electronic device 1201, or one or more other components may be added to the electronic device 1201. Some of the components may be implemented as a single integrated circuit (IC). For example, the sensor module 1276 (e.g., a fingerprint sensor, an iris sensor, or an illuminance sensor) may be embedded in the display device 1260 (e.g., a display).

The processor 1220 may execute software (e.g., a program 1240) to control at least one other component (e.g., a hardware or a software component) of the electronic device 1201 coupled with the processor 1220 and may perform various data processing or computations.

As at least part of the data processing or computations, the processor 1220 may load a command or data received from another component (e.g., the sensor module 1246 or the communication module 1290) in volatile memory 1232, process the command or the data stored in the volatile memory 1232, and store resulting data in non-volatile memory 1234. The processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or execute a particular function. The auxiliary processor 1223 may be implemented as being separate from, or a part of, the main processor 1221.

The auxiliary processor 1223 may control at least some of the functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). The auxiliary processor 1223 (e.g., an image signal processor or a communication processor) may be implemented as part of another component (e.g., the camera module 1280 or the communication module 1290) function-ally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by another component (e.g., the processor 1220) of the electronic device 1201, from the outside (e.g., a user) of the electronic device 1201. The input device 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1260 may visually provide informa-tion to the outside (e.g., a user) of the electronic device 1201. The display device 1260 may include, for example, a display, a hologram device, or a projector and control circuitry to control a corresponding one of the display, hologram device, and projector. The display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. The audio module 1270 may obtain the sound via the input device 1250 or output the sound via the sound output device 1255 or a headphone of an external electronic device 1202 directly (e.g., wired) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. The sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device 1202 directly (e.g., wired) or wirelessly. The interface 1277 may include, for example, a high-definition multimedia interface (HDMI), a universal serial bus (USB) interface, a secure digital (SD) card interface, or an audio interface.

A connecting terminal 1278 may include a connector via which the electronic device 1201 may be physically con-nected with the external electronic device 1202. The con-necting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or an electrical stimulus which may be recognized by a user via tactile sensation or kinesthetic sensation. The haptic module 1279 may include, for example, a motor, a piezo-electric element, or an electrical stimulator.

The camera module 1280 may capture a still image or moving images. The camera module 1280 may include one or more lenses, image sensors, image signal processors, or flashes. The power management module 1288 may manage power supplied to the electronic device 1201. The power management module 1288 may be implemented as at least part of, for example, a power management integrated circuit (PMIC).

The battery 1289 may supply power to at least one component of the electronic device 1201. The battery 1289 may include, for example, a primary cell which is not rechargeable, a secondary cell which is rechargeable, or a fuel cell.

The communication module 1290 may support establish-ing a direct (e.g., wired) communication channel or a wireless communication channel between the electronic device 1201 and the external electronic device (e.g., the electronic device 1202, the electronic device 1204, or the server 1208) and performing communication via the estab-lished communication channel. The communication module 1290 may include one or more communication processors that are operable independently from the processor 1220 (e.g., the AP) and supports a direct (e.g., wired) communi-cation or a wireless communication. The communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communi-cation (PLC) module). The communication module 1290 may include an LTE modem and an NR modem. A corre-sponding one of these communication modules may com-municate with the external electronic device via the first network 1298 (e.g., a short-range communication network, such as Bluetooth™, wireless-fidelity (Wi-Fi) direct, or a standard of the Infrared Data Association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless com-munication module 1292 may identify and authenticate the electronic device 1201 in a communication network, such as the first network 1298 or the second network 1299, using subscriber information (e.g., international mobile subscriber identity (IMSI)) stored in the subscriber identification mod-ule 1296.

In accordance with an embodiment of the disclosure, the wireless communication module 1292 may include an LTE module and an NR module, which respectively include at least one LTE modem and at least one NR modem.

The antenna module 1297 may transmit or receive a signal or power to or from the outside (e.g., the external electronic device) of the electronic device 1201. The antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

Commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. All or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method of resource selection performed by a user equipment (UE) in a coexistence band of a first communication scheme and a second communication scheme, the method comprising:

obtaining, through a first communication scheme modem, a set of candidate resources for resource selection within a resource selection window, and first sensing information for potential resources for transmission;

obtaining, through a second communication scheme modem, resource information corresponding to the second communication scheme, the resource information including second sensing information and future reservations;

processing, based on pre-configuration parameters, the resource information corresponding to the second communication scheme with the first sensing information;

excluding resources, which are identified as occupied based on the processed information, from the set of candidate resources for resource selection for use by the first communication scheme;

selecting a resource for use by the first communication scheme from remaining resources within the set of candidate resources after the excluding; and transmitting using the selected resource.

2. The method of claim 1, wherein processing the resource information corresponding to the second communication scheme with the first sensing information comprises identifying resources occupied by the first communication scheme and the second communication scheme within the resource selection window.

3. The method of claim 1, further comprising excluding resources from the set of candidate resources, which cannot be sensed due to a half-duplex constraint of at least one of the first communication scheme or the second communication scheme.

4. The method of claim 1, wherein the first communication scheme includes a new radio (NR) scheme, and wherein the second communication scheme includes a long term evolution (LTE) scheme.

5. The method of claim 1, further comprising passing, to a higher layer for processing, the set of candidate resources, after excluding the resources.

6. The method of claim 1, wherein the second sensing information and the future reservations included in the resource information are utilized in the processing only if received early before a time threshold based on processing time requirements.

7. The method of claim 1, wherein processing the resource information corresponding to the second communication scheme with the first sensing information comprises mapping the second sensing information to corresponding items of the first sensing information based on the pre-configuration parameters.

8. The method of claim 1, wherein the first communication scheme uses 15 kHz sub-carrier spacing.

9. A method of resource selection performed by a user equipment (UE) in a coexistence band of a first communication scheme and a second communication scheme, the method comprising:

obtaining, through a first communication scheme modem, a set of candidate resources for resource selection within a resource selection window, and first sensing information for potential resources for transmission;

obtaining, through a second communication scheme modem, resource information corresponding to the second communication scheme, the resource information including second sensing information and future reservations;

processing the resource information corresponding to the second communication scheme with the first sensing information;

excluding resources, which are identified as occupied based on the processed information, from the set of candidate resources for resource selection for use by the first communication scheme;

selecting a resource for use by the first communication scheme from remaining resources within the set of candidate resources after the excluding; and transmitting using the selected resource, wherein processing the resource information corresponding to the second communication scheme with the first sensing information comprises mapping the second sensing information to corresponding items of the first sensing information based on a mapping rule.

10. The method of claim 9, wherein the mapping rule maps at least one of periodicities or priorities of the second communication scheme to the first communication scheme.

11. The method of claim 9, wherein the mapping rule maps a plurality of the priorities the second communication scheme to a highest or second highest priority of the first communication scheme.

12. The method of claim 9, wherein the mapping rule maps the future reservations of the second communication scheme to corresponding future reservations of the first communication scheme.

13. A user equipment (UE) to perform resource selection in a coexistence band of a first communication scheme and a second communication scheme, the UE comprising:

a first communication scheme modem;

a second communication scheme modem; and a processor configured to:

obtain, through the first communication scheme modem, a set of candidate resources for resource selection within a resource selection window, and first sensing information for potential resources for transmission;

obtain, through the second communication scheme modem, resource information corresponding to the second communication scheme, the resource information including second sensing information and future reservations;

process, based on pre-configuration parameters, the resource information corresponding to the second communication scheme with the first sensing information;

exclude resources, which are identified as occupied based on the processed information, from the set of candidate resources for resource selection for use by the first communication scheme;

select a resource for use by the first communication scheme from remaining resources within the set of candidate resources after the excluding; and transmit using the selected resource.

14. A method of resource selection performed by a user equipment (UE) in a coexistence band of a first communication scheme and a second communication scheme, the method comprising:

obtaining, through a first resource selection procedure, a first set of candidate resources to be used for transmission in the first communication scheme;

obtaining, through a second resource selection procedure, a second set of candidate resources in the second communication scheme;

mapping, based at least on priority, the second set of candidate resources to counterpart resources in the first communication scheme;

identifying, for each mapped candidate resource in the second set of candidate resources, overlapping candidates included in the first set of candidate resources;

removing, from the first set of candidate resources, any candidate resources that are not identified as overlapping a mapped candidate resource in the second set of candidate resources; and transmitting using a resource selected from the first set of candidate resources after removing the candidate resources that are not identified as overlapping the mapped candidate resources in the second set of candidate resources.

15. The method of claim 14, wherein the second set of candidate resources are mapped to the counterpart resources of the first communication schemes further based on configuration parameters of at least one of the first communication scheme or the second communication scheme.

16. The method of claim 14, further comprising, after removing the candidate resources that are not identified as overlapping the mapped candidate resources in the second set of candidate resources, from the first set of candidate resources, determining if a number of the candidate resources remaining in the first set of candidate resources satisfies a requirement.

17. The method of claim 16, further comprising selecting resources for transmission from the candidate resources remaining in the first set of candidate resources, in response to determining that the number of candidate resources remaining in the first set of candidate resources satisfies the requirement.

18. The method of claim 16, further comprising, in response to determining that the number of candidate resources remaining in the first set of candidate resources does not satisfy the requirement, performing one of:

selecting a resource from the first set of candidate resources;

dropping transmission;

reperforming the first resource selection procedure with a higher threshold; or adding at least one of the removed candidates back to the first set of candidate resources.

19. The method of claim 16, wherein the requirement includes a preconfigured percentage threshold.

20. The method of claim 14, wherein mapping the second set of candidate resources to counterpart resources in the first communication scheme comprises one of:

applying a one-to-one mapping between priorities of the first communication scheme and the second communication scheme; or applying a many-to-one mapping, wherein all priorities of the second communication scheme are mapped to a highest priority of the first communication scheme.

\* \* \* \* \*